United States Patent [19]

Ando

[11] Patent Number: 5,272,685
[45] Date of Patent: Dec. 21, 1993

[54] OPTICAL SYSTEM FOR AN INFORMATION PROCESSING APPARATUS

[75] Inventor: Hideo Ando, Kawasaki, Japan

[73] Assignee: Kabushiki Kaisha Toshiba, Kawasaki, Japan

[21] Appl. No.: 630,844

[22] Filed: Dec. 20, 1990

[30] Foreign Application Priority Data

Dec. 22, 1989 [JP] Japan .................................. 1-331110
Dec. 22, 1989 [JP] Japan .................................. 1-331112

[51] Int. Cl.⁵ .............................................. G11B 7/12
[52] U.S. Cl. ............................... 369/44.14; 369/44.23; 369/112; 369/110; 359/487
[58] Field of Search ............. 369/44.24, 44.23, 44.12, 369/44.14, 112, 110, 109, 118, 44.11; 250/201.5; 359/487, 494

[56] References Cited

U.S. PATENT DOCUMENTS

| | | | |
|---|---|---|---|
| 4,659,185 | 4/1987 | Aughton | 359/487 |
| 4,991,937 | 2/1991 | Urino | 359/494 |
| 5,073,879 | 12/1991 | Ando et al. | 369/110 |
| 5,077,723 | 12/1991 | Yoshimatsu | 369/110 |
| 5,097,463 | 3/1992 | Wagenblast et al. | 369/110 |

*Primary Examiner*—Tommy P. Chin
*Assistant Examiner*—Khoi Truong
*Attorney, Agent, or Firm*—Finnegan, Henderson, Farabow, Garrett & Dunner

[57] ABSTRACT

In an optical system, a light beam reflected from an information recording medium is guided to a combination of first and second prisms. The first prism is made of optically anisotropic material and second prism is made of optically isotropic material. The light beam incident on the first prism is separated ordinary light rays and extraordinary light rays and the ordinary and extraordinary light rays are guided in different directions in the first and second prisms. Both of the ordinary and extraordinary light rays are detected so that information is reproduced in response to the light rays.

24 Claims, 19 Drawing Sheets

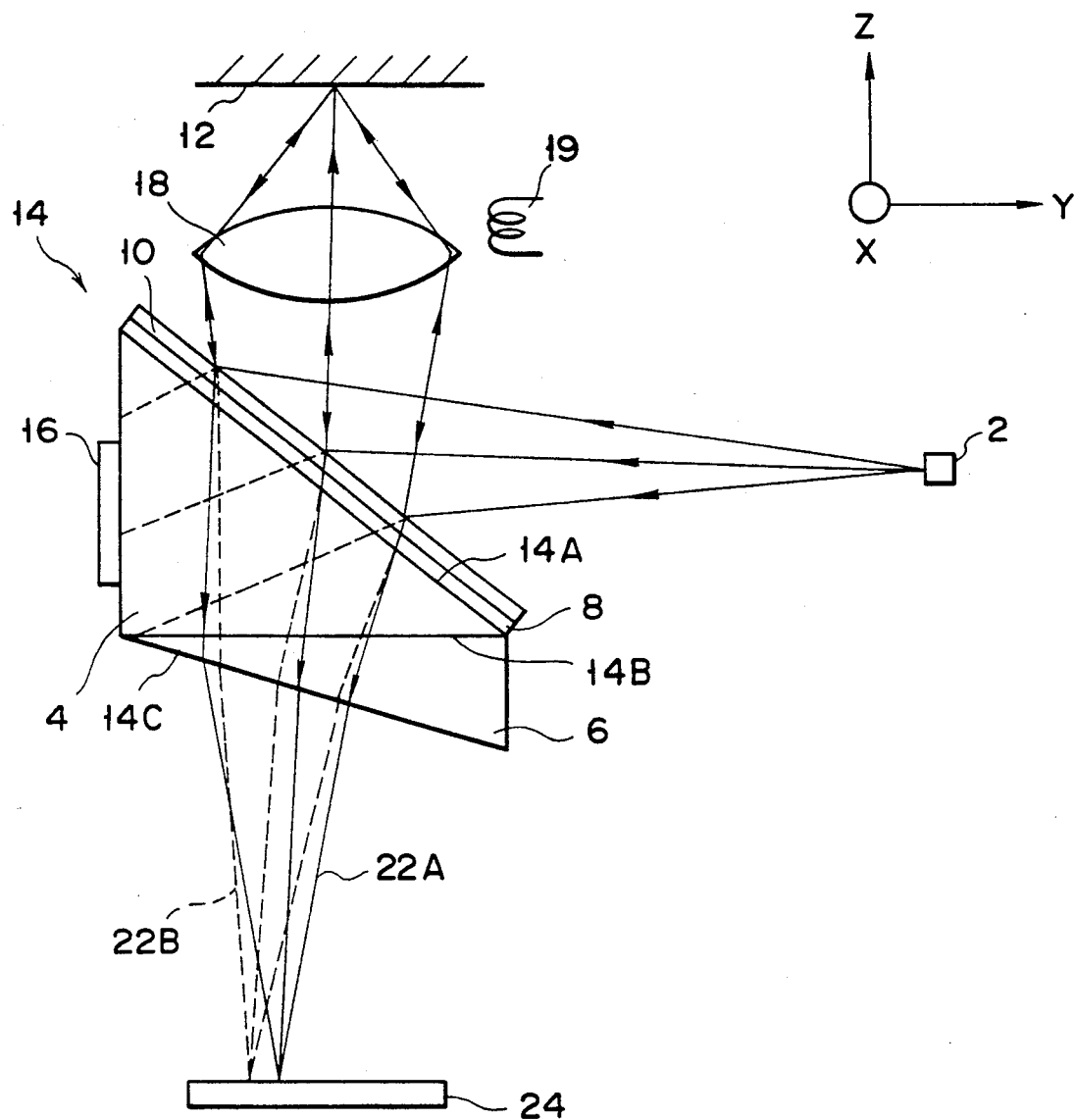
F I G. 1

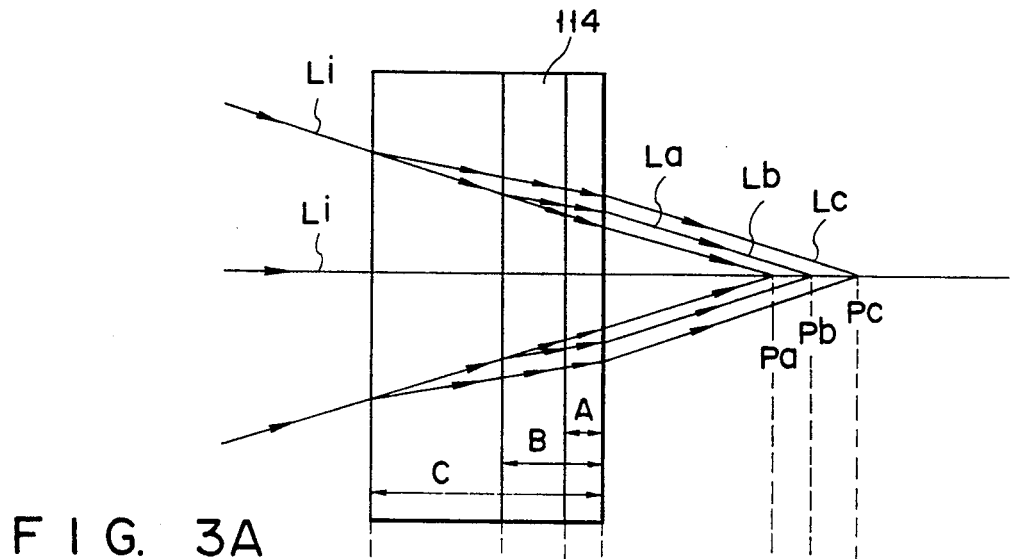
F I G. 3A
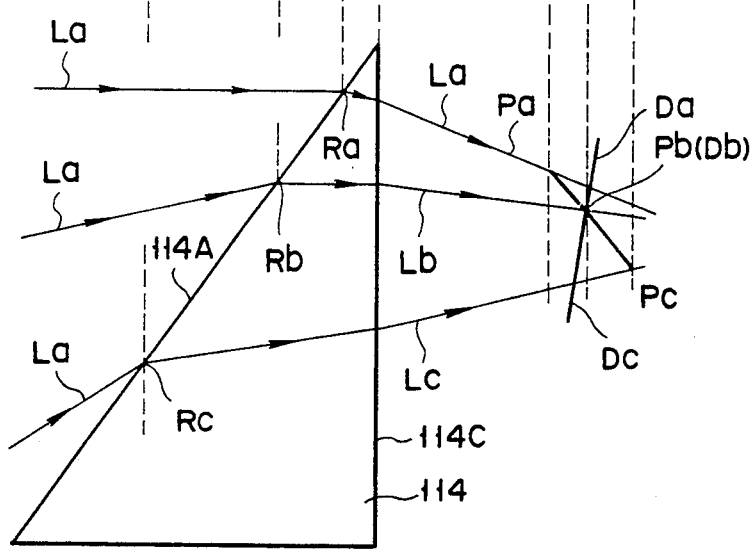
F I G. 3B

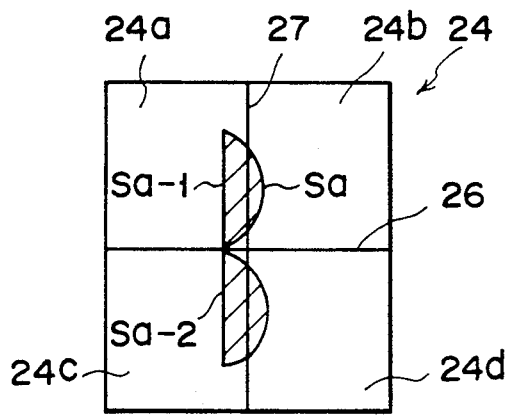
F I G. 4A
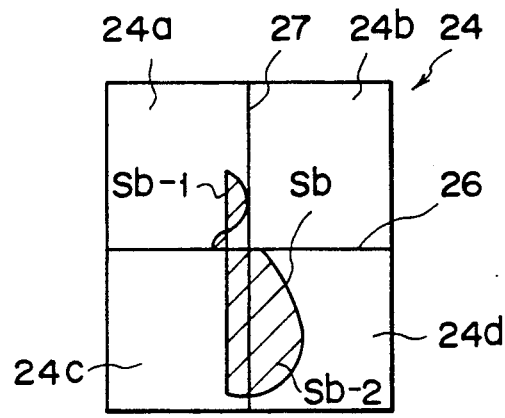
F I G. 4B
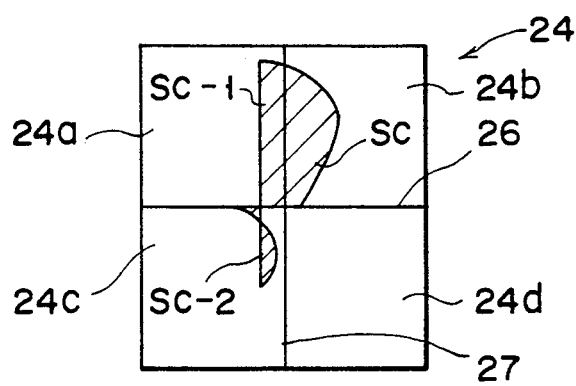
F I G. 4C

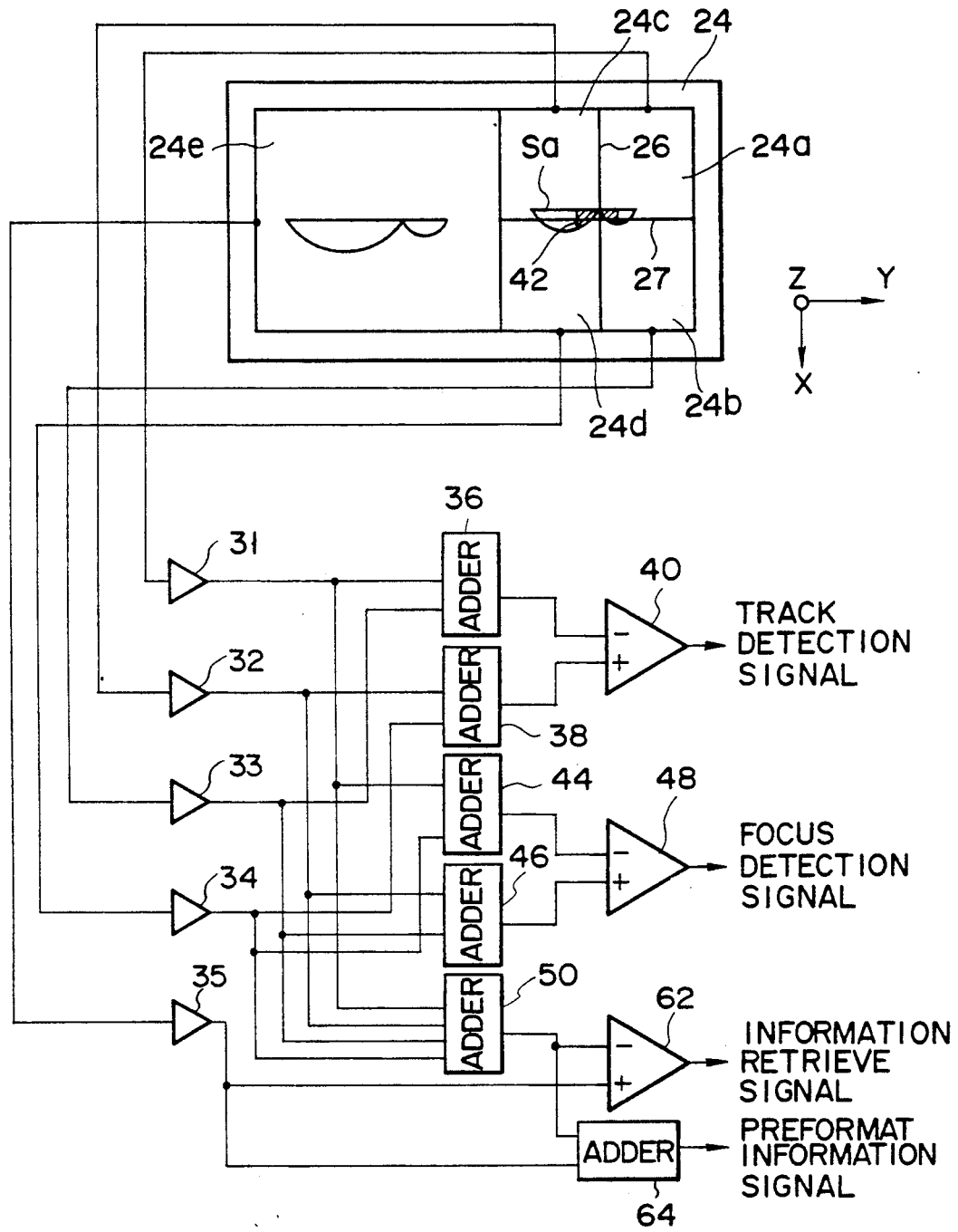
F I G. 5

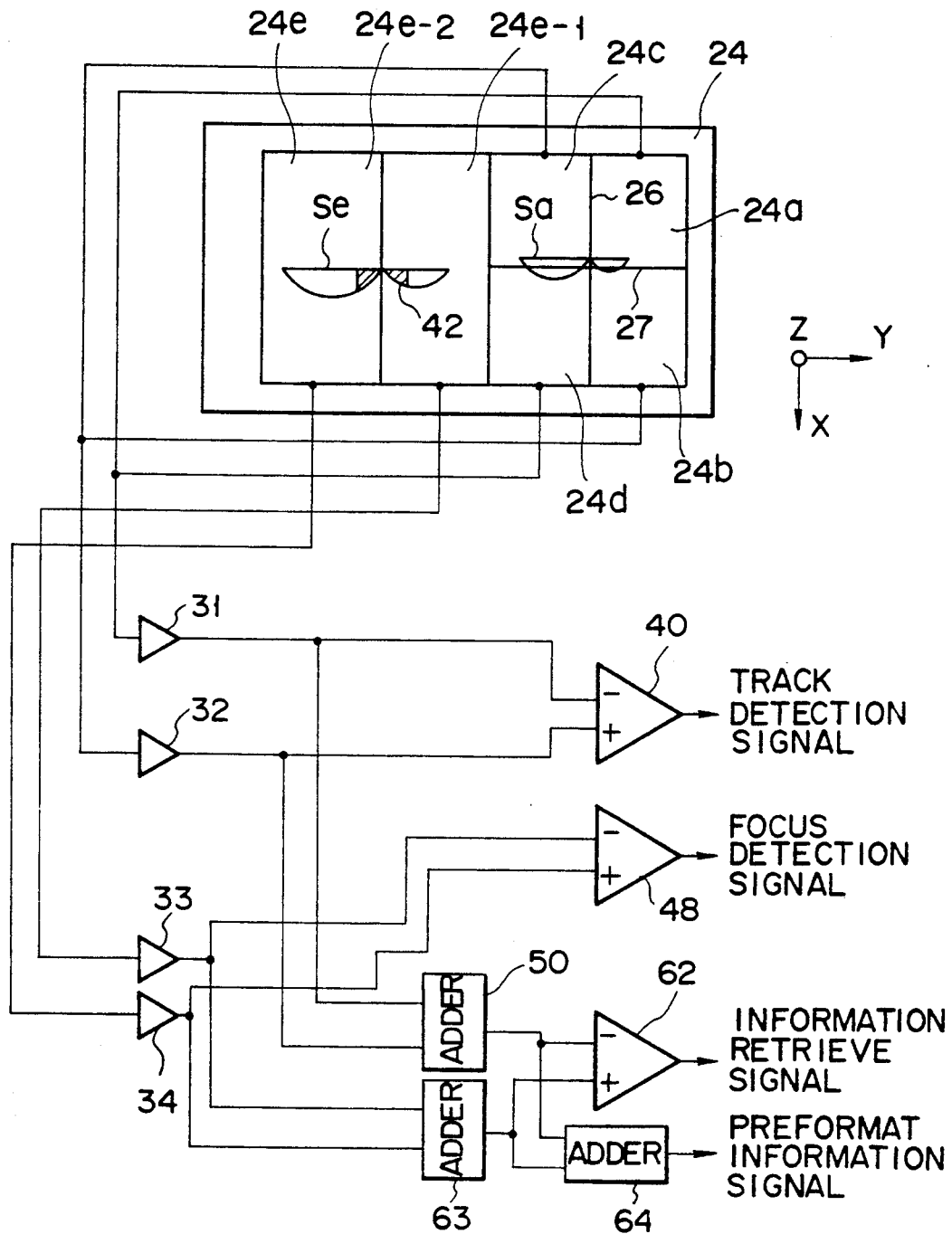
F I G. 6

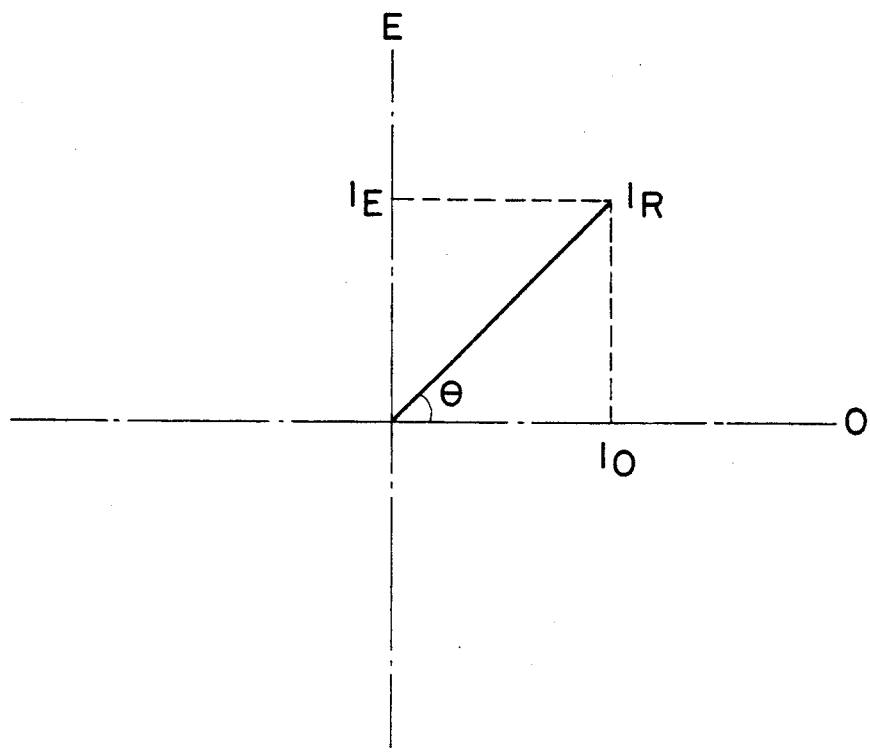
F I G. 10

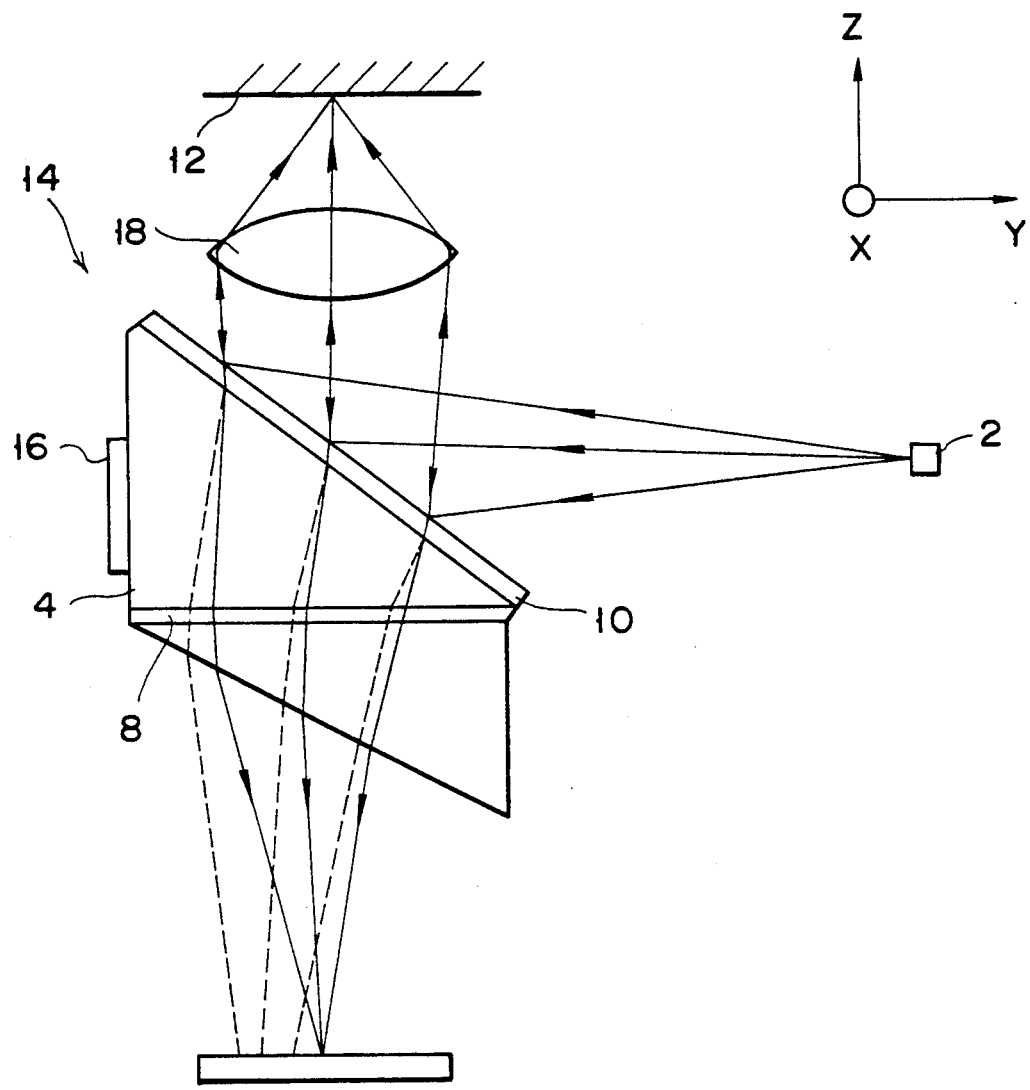
F I G. 14

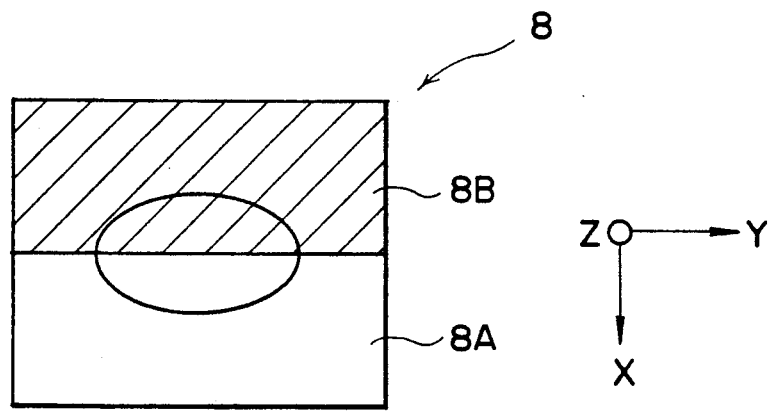
F I G. 15
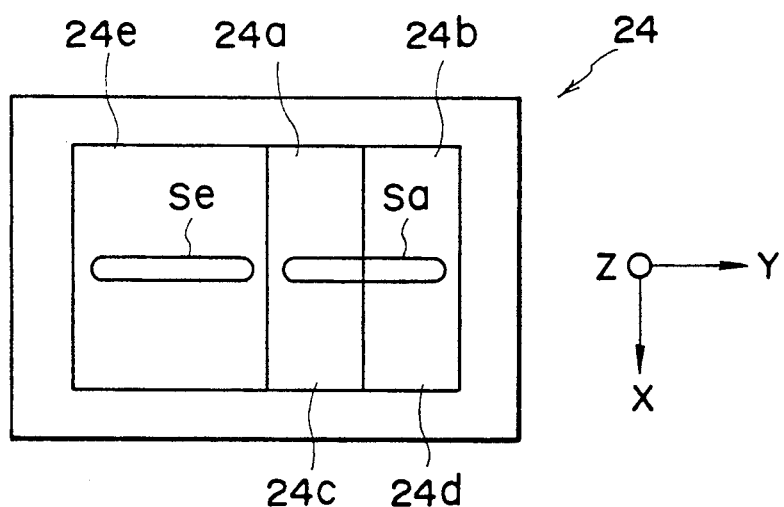
F I G. 16

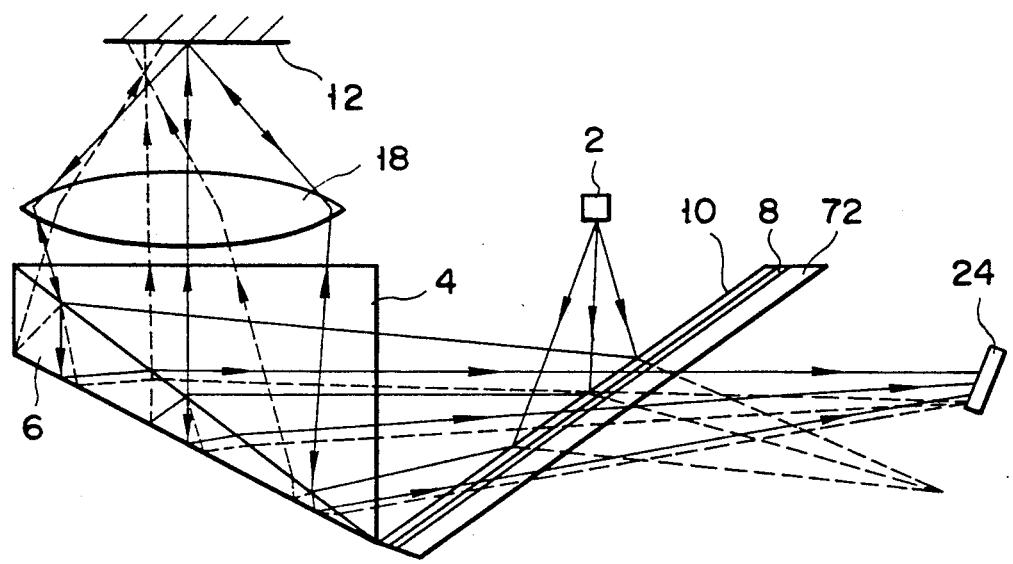
F I G. 18
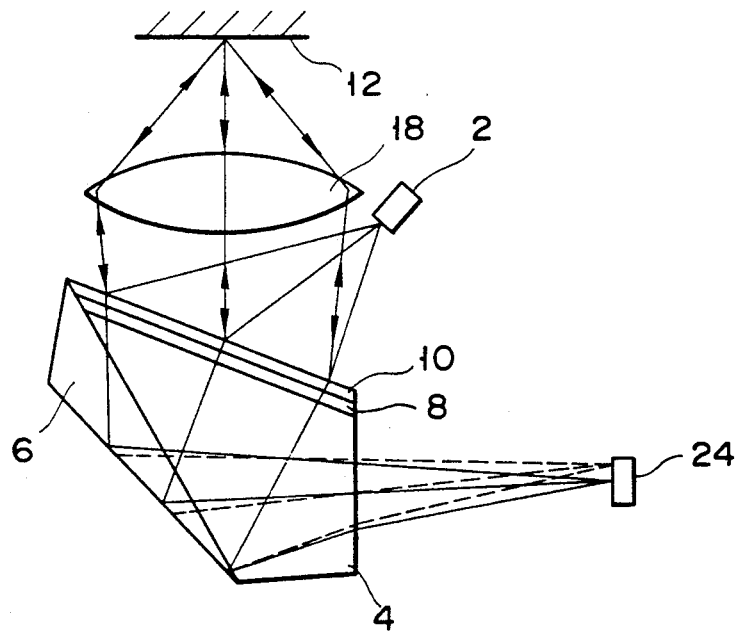
F I G. 19

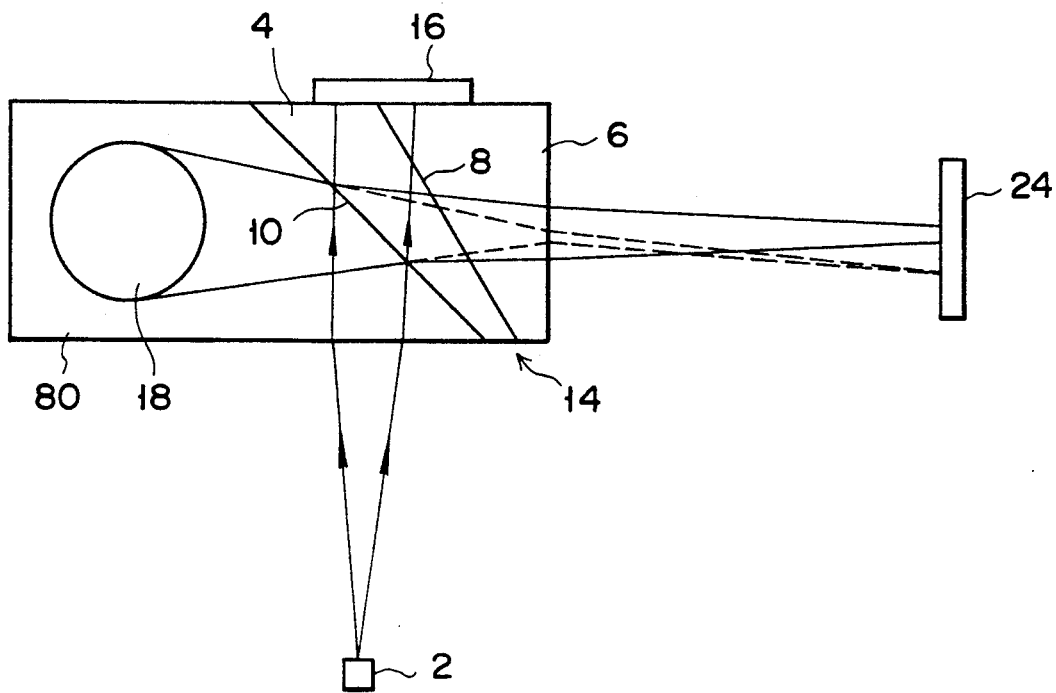
F I G. 20
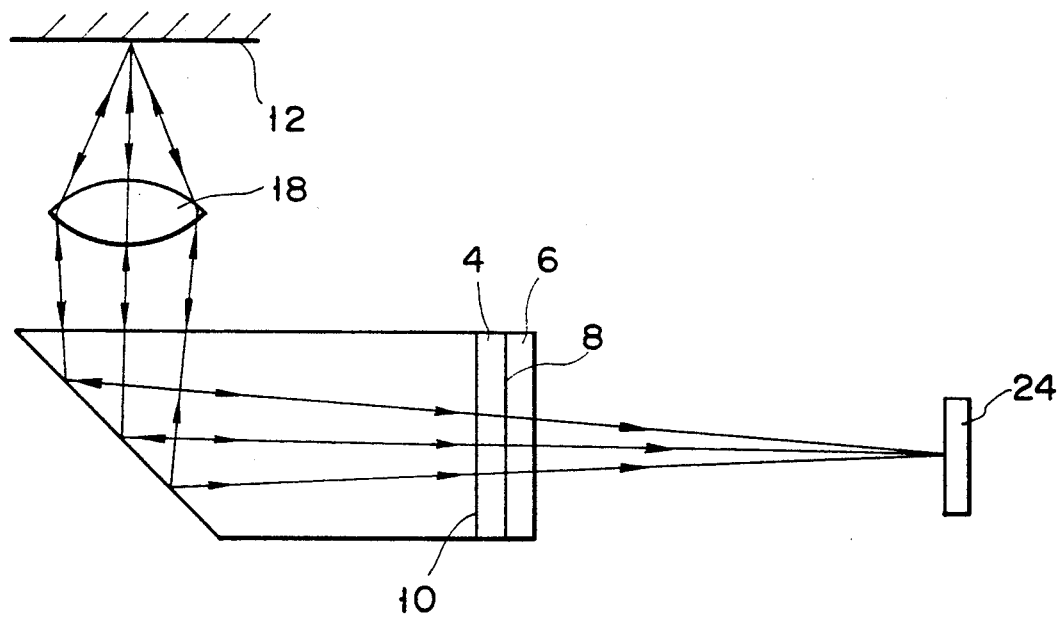
F I G. 21

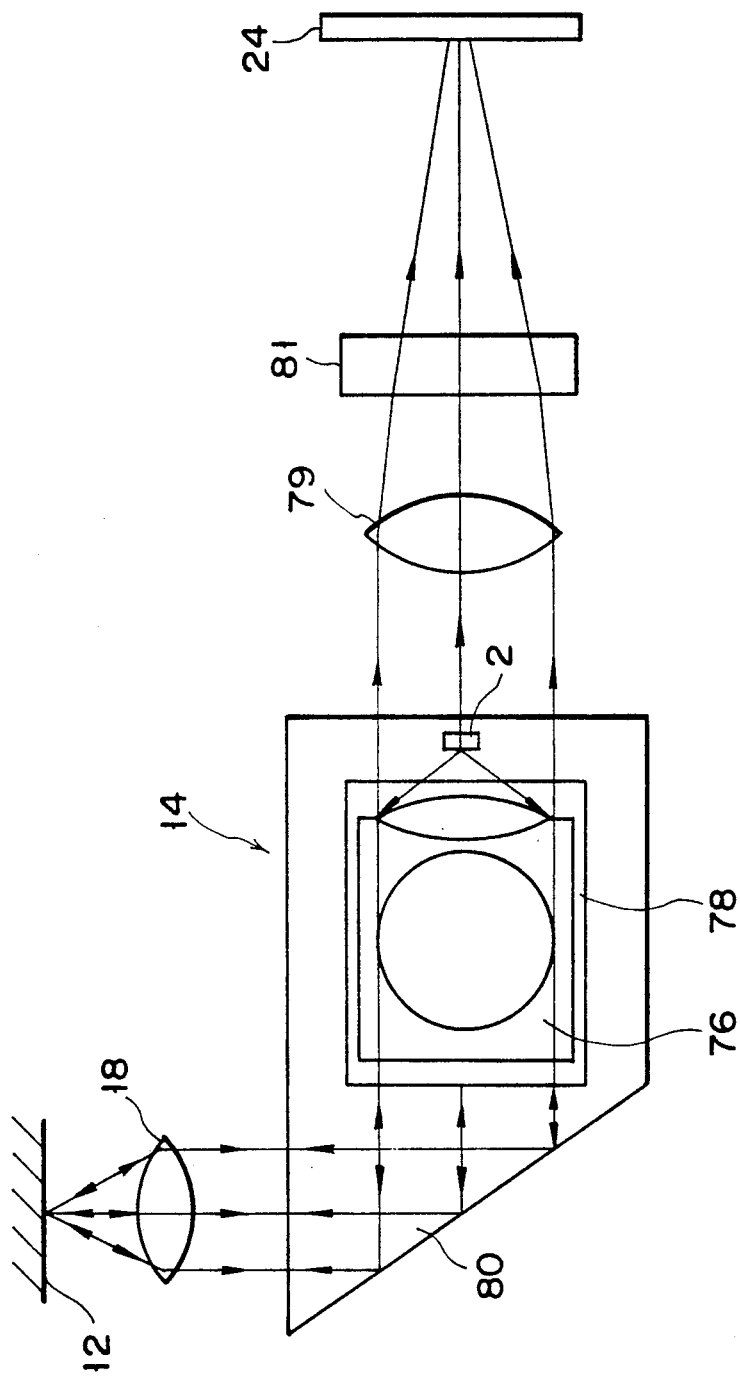
F I G. 23

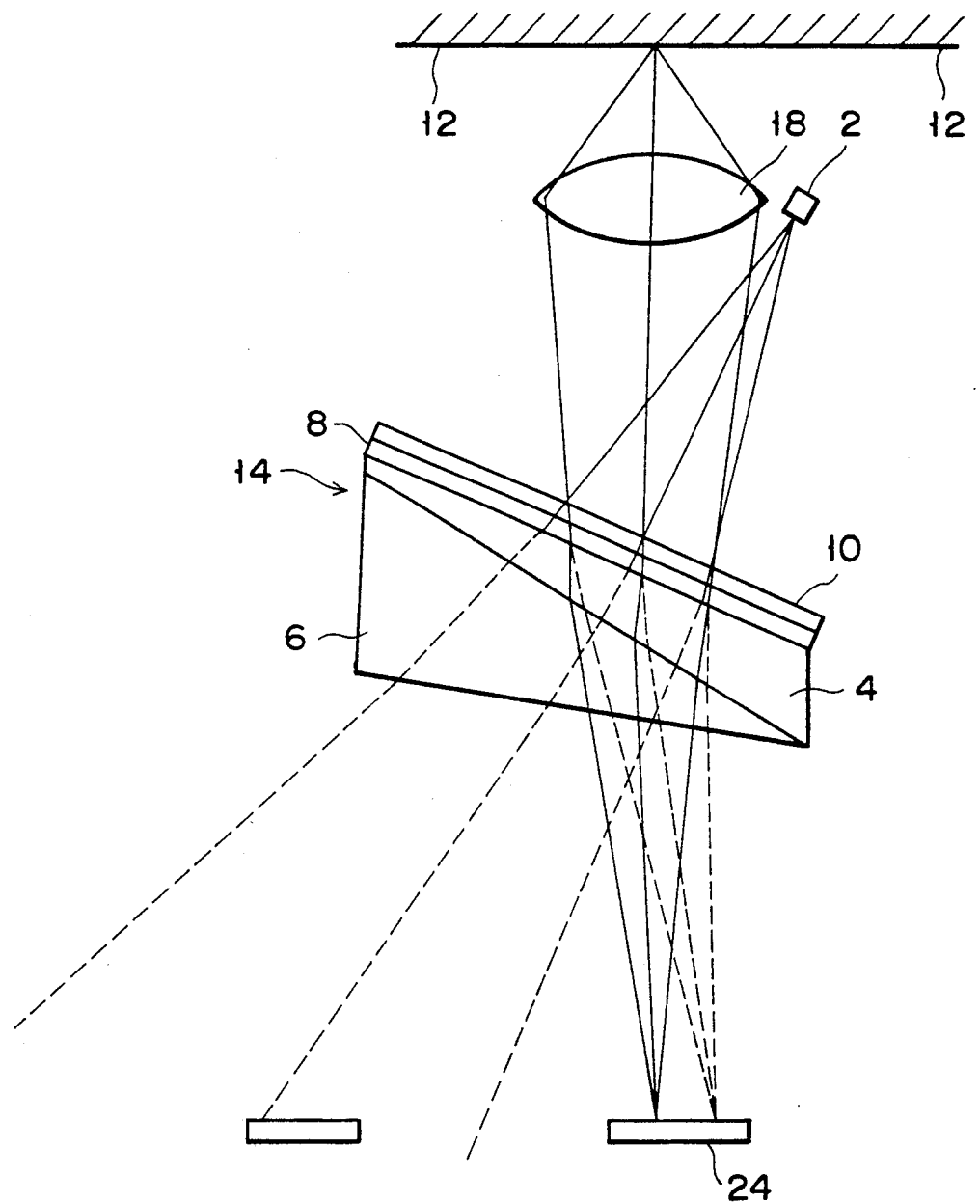
F I G. 24

OPTICAL SYSTEM FOR AN INFORMATION PROCESSING APPARATUS

BACKGROUND OF THE INVENTION

1. Field of the Invention

The present invention relates to an information recording/reproducing apparatus for reproducing information from an information recording medium by using a photomagnetic effect and, more particularly, to an improvement in an optical system of an optical head of the information recording/reproducing apparatus.

2. Description of tne Related Art

Various types of information recording/reproducing apparatuses for reproducing information from a photomagnetic recording medium, i.e., a photomagnetic disk by using a photomagnetic effect are known, and various types of proposals have been made. For example, Published Unexamined Japanese Patent Application No. 57-169,934 and corresponding U.S. Pat. No. 4,482,803 or Published Unexamined Japanese Patent Application No. 56-57,013 and corresponding U.S. Pat. No. 4,358,200 disclose a focal point detecting optical system for detecting a focal point of an information recording-/reproducing apparatus. In the optical system disclosed in the above patent specifications, a parallel plate or a wedge prism in which a half mirror is formed on its one surface is arranged in a light source optical path, and a light beam reflected by the half mirror is directed toward an information recording medium. The light beam reflected by the information recording medium is transmitted through the parallel plate or the wedge prism, and an astigmatism is given to the transmitted light beam and the light beam is detected by a photodetector. Published Unexamined Japanese Patent Application No. 58-171,739 or 59-77,649 or U.S. Pat. No. 477,144 discloses an optical system in which a pair of birefringent prisms are bonded so that their optical axes are perpendicular to each other, and a light beam is transmitted through the birefringent prisms to change propagation directions of two polarization components of the light beam perpendicular to each other, thereby splitting the light beam. The split light beams are detected, and a difference between the detected light intensities is detected as a reproduction signal.

In the photomagnetic information reproducing apparatus disclosed in Published Unexamined Japanese Patent Application No. 57-169,934 and corresponding U.S. Pat. No. 4,482,803 or Published Unexamined Japanese Patent Application No. 56-57,013 and corresponding U.S. Pat. No. 4,358,200, although a defocus detecting optical system can be made compact, an optical system for photomagnetic information reproduction must be provided independently of the focal point detecting optical system. Therefore, an optical system of the information reproducing apparatus is complicated, and the entire apparatus is enlarged in size. In the photomagnetic information reproducing apparatus disclosed in Published Unexamined Japanese Patent Application No. 58-171,739 or 59-77,649 or U.S. Pat. No. 477,144, only an optical system for information reproduction is disclosed, but no defocus/tracking detecting optical system is disclosed. When the defocus/tracking detecting optical system is incorporated in such an information reproducing apparatus, even if an optical system using a birefringent prism is adopted as a reproducing optical system, the optical system is complicated, and the entire apparatus is enlarged in size.

As described above, according to a conventional information reproducing apparatus using a photomagnetic effect, an optical system is complicated, and the entire apparatus is enlarged in size.

SUMMARY OF THE INVENTION

It is an object of the present invention to provide an information reproducing apparatus which can be made compact since an optical system is made compact and simplified.

It is another object of the present invention to provide an information reproducing apparatus using a photomagnetic effect, which can be made compact since an optical system is made compact and simplified.

According to the invention, there is provided an optical system for reading out information from an information recording medium, comprising:

means for separating a light beam from the information recording medium into first and second light beams having different first and second vibration planes, the separating means including a first prism of an anisotropic material having first and second refractive indices peculiar to the first and second light beams, respectively, and a second prism made of an isotropic material having a third refractive index peculiar to both of the first and second light beams; and means for reproducing information recorded on the information recording medium in accordance with the first and second separated light beams emerged from the separating means.

According to the invention, there is also provided an optical system for reading out information from an information recording medium, comprising:

converging means, movable along an optical axis, for converging the reflection light beam on an information recording medium;

separating means for separating a light beam from the information recording medium into first and second light beams having different first and second vibration planes, the separating means including a first prism of an anisotropic material having first and second refractive indices peculiar to the first and second light beams, respectively, and a second prism made of an isotropic material having a third refractive index peculiar to both of the first and second light beams;

means for generating a focusing signal corresponding to a position of the converging means on the optical axis, in response to the first light beam emerged from the separating means; and moving means for moving the converging means in accordance with the focusing signal to maintain the converging means in a in-focus state in which a minimum beam spot is formed on the information recording medium by the light beam.

According to the invention, there is further provided an optical element used for a system for reading out information from an information recording medium, comprising:

separating means for separating a light beam into first and second light beams having different first and second vibration planes, the separating means including a first prism of an anisotropic material having first and second refractive indices peculiar to the first and second light beams, respectively; and means for reproducing information recording on the information recording medium in accordance with the first and second light beams from the separating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view showing an optical system of an information reproducing apparatus using a photomagnetic effect according to an embodiment of the present invention;

FIGS. 3A and 3B are plan and side views, respectively, showing a light beam locus in the detecting optical element shown in FIG. 1;

FIGS. 4A, 4B, and 4C are plan views showing light beam spots formed on the detection surface of a detector in in-focus and out-of-focus states;

FIGS. 5 and 6 are block diagrams showing practical arrangements of a signal processor shown in FIG. 1;

FIG. 10 is a vector graph showing a relationship between ordinary and extraordinary light rays in the detecting optical element shown in FIG. 2; and FIGS. 11 to 24 are schematic views respectively showing an optical system and a detector of an information reproducing apparatus using a photomagnetic effect according to other embodiments of the present invention.

DETAILED DESCRIPTION OF THE PREFERRED EMBODIMENT

FIG. 1 schematically shows an optical system of an information reproducing apparatus using a photomagnetic effect according to an embodiment of the present invention. This optical system adopts, as a light source, a light source unit constituted by a semiconductor laser 2 for generating a substantially linearly polarized light beam or a combination of the semiconductor, laser 2 for generating a light beam and a polarizer (not shown) for converting the light beam from the semiconductor laser 2 into a linearly polarized light beam. Referring to FIG. 1, if a tracking guide formed on a photomagnetic recording medium having information recorded therein, i.e., a photomagnetic recording optical disk 12 extends in the X direction, a light beam is generated by the above light source such that a polarization plane of the beam is inclined toward the X or Z axis to define a predetermined angle therebetween, and is directed to a detecting optical element 14.

Figure 2:
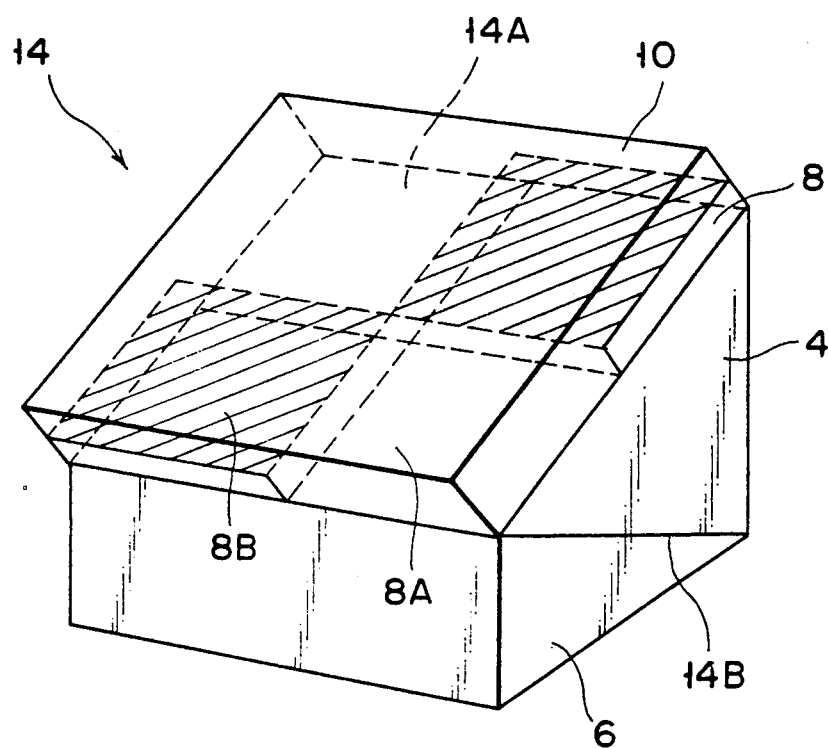
FIG. 2 is a perspective view showing a detecting optical element shown in FIG. 1.

The detecting optical element 14 has first and second boundary surfaces 14A and 14B, and prism members 4 and 6 are bonded to each other via the second boundary surface 14B shown in FIG. 2, such that the smallest corner portions thereof oppose each other on the surface 14B. One of the prism members is made of an optically a anisotropic material, and the other member is made of an optically isotropic material such as optical glass or transparent plastic, e.g., acryl, polycarbonate, or an ABS resin. A mask layer 8 is positioned in the X direction. A light beam is generated by the above light source such that a polarization plane of the beam is inclined toward the X or Z axis to define a predetermined angle therebetween, and is directed to a detecting optical element 14.

A mask layer 8 is formed on the first boundary surface 14A opposing the boundary surface 14B of the prism member 4. As shown in FIG. 2, regions (hatched regions) corresponding to the first and third quadrants, defined by lines drawn perpendicularly to each other such that an optical axis passes through the intersection therebetween, are formed as layers for shielding a light beam in the mask layer 8. In addition, a light-transmittable reflecting layer 10 having specific reflectance and transmittance is formed on the mask layer 8. The layers 8 and 10 may be stacked on the surface of the prism member 4 by vapor deposition or sputtering. Alternatively, a parallel plate in which the light-transmittable reflecting layer 10 is formed on its one surface and the mask layer 8 consists of a positive crystal having a larger refractory index with respect to extraordinary light rays than to ordinary light rays. Examples of such a positive crystal are rutile or quartz crystal which can be artificially manufactured.

A portion of a divergent light beam incident on the detecting optical element 14 having the above arrangement is reflected by the light-transmittable reflecting layer 10, and the remaining component is transmitted through the element 14. The light beam guided into the detecting element 14 is transmitted through the light-transmittable reflecting layer 10 and the prism member 4, and a central portion of the transmitted light beam having a comparatively high light intensity is incident on a photodetector 16 arranged on the side surface of the prism member 4. The photodetector 16 detects the light intensity of the incident light beam central portion. A detection signal from the photodetector 16 is fed back to a driver (not shown) of the semiconductor laser 2, and the light beam generated by the semiconductor laser 2 is controlled in accordance with the detection signal. That is, the driver (not shown) for driving the semiconductor laser 2 compares the detection signal with a reference signal voltage and supplies a driver current corresponding to a difference signal voltage to the semiconductor laser 2, thereby stably driving the semiconductor laser 2.

The component of the divergent light beam reflected by the light-transmittable reflecting layer 10 is focused by an objective lens 18 toward the tracking guide formed on the information recording medium 12. If the objective lens 18 is kept in an in-focus state, a beam waste of the convergent light beam is projected on the reflecting surface of the information recording medium 12, and a minimum beam spot is formed on the reflecting surface of the medium 12. If the objective lens 18 is slightly moved from the in-focus position toward the information recording medium 12 along its optical axis or set in an out-of-focus position separated from the medium 12, the beam waste of the convergent light beam is not projected on the reflecting surface of the information recording medium 12, and a spot larger than the minimum beam spot is formed on the reflecting surface of the optical disk 12. A divergent light beam returned from the information recording medium 12 is converted into a convergent light beam by the objective lens 18 and directed toward the detecting optical element 14 through the lens 18. A portion of the convergent light beam is reflected by the light-transmittable reflecting layer 10 toward the semiconductor laser 2, and the remaining portion is transmitted through the layer 10.

A portion of the light beam transmitted through the light-transmittable reflecting layer 1 is shielded by the mask layer 8, and the remaining portion is transmitted through the layer 8 and guided to the prism 4. The guided light beam is refracted by the first boundary surface 14A, incident on the prism 6, and then refracted again by the second boundary surface 14B. Since one of the prisms 4 and 6 is made of an optically anisotropic material, the light beam is split into ordinary light rays 22A and extraordinary light rays 22B in different directions when it is refracted by the first or second boundary surface 14A or 14B. These ordinary and extraordinary light rays transmitted from the emerging surface of the prism 6 are directed to different detection regions of a photodetector 24 and detected by the photodetector 24. In the optical system shown in FIG. 1, the prism 4 is made of an optically anisotropic material.

In the optical system shown in FIG. 1, the photodetector 24 detects the ordinary light rays 22A, and a signal processor shown in FIG. 6 processes the detection signal from the photodetector 24 and generates a defocus signal and a tracking signal. In addition, the signal processor generates a signal indicating a light intensity difference between the ordinary and extraordinary light rays 22A and 22B detected by the photodetector 24 as a reproduction signal. A voice coil 19 is driven in accordance with the defocus signal to drive the objective lens 18 or the entire optical system in the optical axis direction, thereby maintaining the lens 18 in an in-focus state. The objective lens 18 or the entire optical system is driven in accordance with the tracking signal in a direction perpendicular to the track formed on the information recording medium 12, and the track is tracked by the focused light beam to maintain the lens 18 in an in-track state. A detection signal generated from the detection region of the photodetector 24 while the objective lens 18 is kept in the in-focus state and the in-track state is converted by the signal processor into a reproduction signal corresponding to information recorded in the information recording medium 12. The reproduction signal generated by the signal processor is displayed as reproduction information on an external display unit (not shown) or the like.

A refractive index with respect to the ordinary light rays 22A transmitted through the optically anisotropic material is always maintained constant and does not depend on the angle of the light rays. Since, however, a refractive index with respect to the extraordinary light rays 22B changes in accordance with the angle of the light rays transmitted through the optically anisotropic material, a larger aberration is given to the extraordinary light rays 22B than to the ordinary light rays 22A, and the large aberration appears in a beam spot formed on the photodetector 24. In a defocus detecting system for detecting a shape change in beam spot formed on the photodetector 24, if a coma exceeds an allowable range and adversely affects the shape change in beam spot, defocus detection characteristics are degraded. In the optical system shown in FIG. 1 or optical systems shown in FIGS. 9, 11, 24, and 14 (to be described later), therefore, a light beam consisting of the ordinary light rays 22A is used to perform only defocus detection or both defocus and track error detection.

If one of the prisms 4 and 6 is made of a positive crystal as an optically anisotropic medium, the refractive index with respect to the extraordinary light rays 22B becomes larger than that with respect to the ordinary light rays 22A. If one of the prisms 4 and 6 is made of a negative crystal as an optically anisotropic material, the refractive index with respect to the ordinary light rays 22A becomes larger than that with respect to the extraordinary light rays 22B. Of the two types of light rays, one type of light rays having a larger refractive index has a larger refracting force and produces a larger coma. When the value of coma is increased to exceed an allowable range, the defocus characteristics are degraded. For this reason, a positive crystal having a larger refractive index with respect to the extraordinary light rays 22B than to the ordinary light rays 22A as described above is preferably used as the optically anisotropic material, and ordinary light rays having a smaller refractive index is used in defocus and tracking detection or in defocus detection.

As described above, the convergent light beam is incident from the object lens 18 onto the prism members 4 and 6 of the detecting optical element 14 shown in FIG. 1. As shown in FIGS. 3A and 3B, this convergent light beam is refracted by the prism members 4 and 6 of the detecting optical element 14 and focused toward a focus line defined by focus points Pa, Pb, and Pc. (For illustrative convenience, the prism members 4 and 6 are equivalently replaced by a single prism member 114 in FIGS. 3A and 3B. In addition, since defocus and tracking are preferably detected by using the ordinary light rays as described above, the figures are illustrated in consideration of only the ordinary light rays.) Actually, light rays La, Lb, and Lc constituting the convergent light beam are incident on different incident points of the first boundary surface 14A of the detecting optical element 14 and refracted at the respective incident points, refracted again at different incident points on the second boundary surface 14B of the element 14, and then emerge from an emerging surface 14C. Similarly, in FIG. 3B showing the side view of the prism member 114 equivalent to the prism members 4 and 6 of the detecting optical element 14, the light rays La, Lb, and Lc are incident on different incident points Ra, Rb, and Rc of a surface 114A of the prism member 114 and refracted by a surface 114C through the prism member 114 toward the photodetector 24. A is apparent from FIGS. 3A and 3B, in the prism member 114, the light rays La, Lb, and Lc are transmitted through paths having physical distances A, B, and C, respectively. That is, the light rays La, Lb, and Lc reach the emerging surface 114C through the optical paths having different optical path lengths. Since, therefore, the light rays La, Lb, and Lc are incident on the surface 114A at different incident points Ra, Rb, and Rc along the optical axis as shown in FIG. 3A, they are split into light rays La, Lb, and Lc transmitted through two-dimensionally different optical paths when they are refracted by the surface 114A. Therefore, the light rays La, Lb, and Lc emerged from the emerging surface 114C are focused at the different focus points Pa, Pb, and Pc, respectively.

Figure 8:
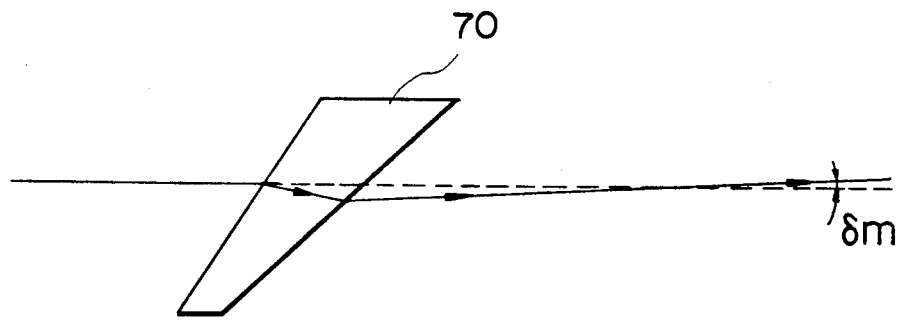

As described above with reference to FIGS. 3A and 3B, an aberration close to a coma is given to the convergent light beam by the detecting optical element 14. Therefore, when the detection surface of the photodetector 24 is arranged in a plane defined by points Da, Db, and Dc and perpendicular to a substantial optical axis O as shown in FIG. 3B, light beam spots Sa, Sb, and Sc as shown in FIGS. 4A, 4B, and 4C are formed on the detection surface of the photodetector 24. The detection surface of the photodetector 24 is divided into upper and lower regions by a division line 26 passing through the center of the detection surface and perpendicular to the optical axis 0 and the focus points Pa, Pb, and Pc and subdivided into detection regions 24a to 24d having an equal area by a division line 27 perpendicular to the division line 26. In the photodetector 24 in which the detection regions 24a to 24d are arranged in this manner, if the objective lens 18 is in an in-focus state, the central line of the detection surface of the photodetector 24 coincides with the focus point Pb. When the focus point Pa is formed slightly before the detection surface of the photodetector 24, i.e., formed on the prism side and the focus point Pc is formed slightly behind the detection surface of the photodetector 24, a dot-like spot corresponding to the focus point Pb is formed on the central line of the detection surface of the photodetector 24. Since a divergent light beam is incident from the focus point Pa onto the upper regions 24a and 24b of the detection surface of the photodetector 24, a beam segment spot Sa-1 is formed. In addition, since a convergent light beam directed to the focus point Pc is radiated on the lower regions 24c and 24d of the detection surface of the photodetector 24, a beam segment spot Sa-2 is formed. The mask layer 8 is formed in the optical path. In the layer 8, as described above with reference to FIG. 2, the light-shielding layers are formed in the regions (hatched regions corresponding to the first and third quadrants defined by orthogonal lines. Since, therefore, a portion of light rays is shielded by the mask layer 8, a beam spot Sa having a shape corresponding to a half of the shape of FIG. 8 is formed as a whole. If the objective lens 18 is in an out-of-focus position close to the information recording medium 12, a converging property of the light beam from the lens 18 is weakened. Therefore, the focus point Pa is moved close to the detection surface of the photodetector 24, the focus point Pb is shifted to behind the detection surface of the photodetector 24, and the focus point Pc is separated backward from the detection surface of the photodetector 24. As shown in FIG. 4B, therefore, a beam segment spot Sb-1 formed in the upper regions 24a and 24b of the detection surface of the photodetector 24 becomes smaller than the beam segment spot Sa-1 formed in the in-focus state, and a beam segment spot Sb-2 formed in the lower regions 24c and 24d of the detection surface of the photodetector 24 becomes larger than the beam segment spot Sa-1 formed in the in-focus state. When the objective lens 18 is in an out-of-focus position separated from the information recording medium 12, the converging property of the light beam from the lens 18 is enhanced. Therefore, the focus point Pa is separated forward from the detection surface of the photodetector 24, the focus point Pb is shifted to before the detection surface of the of the photodetector 24, and the focus point Pc is moved toward the detection surface of the photodetector 24. As shown in FIG. 4C, therefore, a beam segment spot Sc-1 formed in the upper regions 24a and 24b of the detection surface of the photodetector 24 becomes larger than the beam segment spot Sa-1 formed in the in-focus state, and a beam segment spot Sc-2 formed in the lower regions 24c and 24d of the detection surface of the photodetector 24 becomes larger than the beam segment spot Sa-2 formed in the in-focus state.

As shown in FIG. 5, the detection regions 24a and 24d of the photodetector 24 are connected to a first adder 44 through amplifiers 31, 33, and detection signals from the regions 24a and 24d are added by the adder 44. The detection regions 24b and 24c of the photodetector 24 are connected to a second adder 46 through amplifiers 32, 34, and detection signals from the regions 24b and 24c are added by the adder 46. Sum signals from the first and second adders 44 and 46 are input to a differential amplifier 48, and a difference between the two signals is amplified and generated as a focus control signal. As described above with reference to FIG. 4A, in the in-focus state, the detection signals from the detection regions 24a and 24b are equal to each other, and the detection signals from the detection regions 24c and 24d are equal to each other. In the infocus state, therefore, the differential amplifier 48 generates a focus control signal of "0" level indicating the in-focus state. When the objective lens 18 is in an out-of-focus state close to the information recording medium 12, a second sum signal obtained by the second adder 46 by adding the detection signals from the detection regions 24b and 24c becomes smaller than a first sum signal obtained by the first adder 44 by adding the detection signals from the detection regions 24a and 24d, and the differential amplifier 48 generates, e.g., a focus control signal of plus level. When the objective lens 18 is in an out-of-focus state separated from the information recording medium 12, the first sum signal obtained by the first adder 44 by adding the detection signals from the detection regions 24a and 24d becomes larger than the second sum signal obtained by the second adder 46 by adding the detection signals from the detection regions 24b and 24c, and the differential amplifier 48 generates, e.g., a focus control signal of plus level.

As shown in FIG. 5, since a light beam is diffracted by the track of the information recording medium 12, a diffraction pattern 42 as a dark portion is formed in the beam spot Sa formed on the detection surface of the photodetector 24. In order to detect this diffraction pattern 42, the detection regions 24a and 24b of the photodetector 24 ar connected to a third adder 36 as shown in FIG. 5, and detection signals from the regions 24a and 24b are added by the adder 36. In addition, the detection regions 24c and 24d of the photodetector 24 are connected to a fourth adder 38, and detection signals from the regions 24c and 24d are added by the adder 38. Third and fourth sum signals from the third and fourth adders 36 and 38 are input to a differential amplifier 40, and a difference between the two signals is generated as a track control signal. In an in-track state in which the track of the information recording medium 12 is correctly tracked by a light beam, the diffraction pattern is formed symmetrically about the division line 26, as shown in FIG. 5. Therefore, the third and fourth adders 36 and 38 generate the third and fourth sum signals of equal level, and the differential amplifier 40 generates a track control signal of "0" level. In an out-of-track state in which the light beam is slightly shifted from the center of the track of the information recording medium 12, the diffraction pattern 42 is slightly shifted in the light beam spot Sa toward the detection regions 24a and 24b or the detection regions 24c and 24d of the photodetector 24. Therefore, the third and fourth adders 36 and 38 generate the third and fourth sum signals of different levels, and the differential amplifier 40 generates a track control signal of plus or minus level.

As shown in FIG. 5, the detection regions 24a, 24b, 24c, and 24d of the photodetector 24 are connected to an adder 50. The polarization plane of a light beam focused on the information recording medium 12 is slightly rotated in accordance with information recorded on the track, i.e., the direction of a magnetic field of a magnetic domain. The light beam having the rotated polarization plane is split by the detecting optical element 14 into ordinary and extraordinary light rays in accordance with the rotation of the polarization plane, i.e., the recorded information. As described above, the ordinary light rays are incident on the detection regions 24a, 24b, 24c, and 24d of the photodetector 24, and the extraordinary light rays are incident on a detection region 24e of the photodetector 24. In order to obtain a difference between the two types of light rays, a sum signal from the adder 50 and a signal from the detection region 24e are input to a comparator 62. The comparator 62, therefore, generates a reproduction signal as a difference signal. When preformat information is recorded by non-erasable preits on the track of the information recording medium 12, a preformat signal is reproduced from an adder 64 by adding the output signal from the adder 50 and the detection signal from the detection region 24e of the photodetector 24.

In the above defocus detecting method, defocus is preferably detected by using the ordinary light rays for the following reason. That is, in the photodetector 24 as shown in FIG. 5, a spot size in the minor axis direction (X direction) of a beam spot formed in the in-focus state has a large influence on focal point detection sensitivity. In the optical system shown in FIG. 1, therefore, an aberration in the X direction is preferably small. It is known that a refractive index of extraordinary light rays transmitted through an optically anisotropic material changes in accordance with the direction of transmission and the change in value corresponds to a change caused by a direction of crossing of an index ellipsoid. When defocus is detected by using extraordinary light rays, therefore, an aberration is given to the extraordinary light rays to cause erroneous defocus detection. Since, however, the refractive index of ordinary light rays is always maintained constant in an optically anisotropic material, defocus can be correctly detected without producing any aberration.

For the same reason, tracking detection is preferably performed by using ordinary light rays. That is, when the beam spot size in the major axis direction (Y direction) of a light beam spot on the photodetector 24 is small, if an aberration is too large, a tracking guide cannot be detected by a so-called push-pull method since light rays cross each other in the optical path. In track error detection performed by the push-pull method, a light intensity pattern of a light beam reflected by the information recording medium 12 and transmitted through the objective lens 18, i.e., an intensity change in diffraction pattern from the tracking guide is detected by two photodetection regions. A detecting lens is normally used to reduce the spot size to project a light beam on the small photodetector 24. If a large aberration is produced in extraordinary light rays and the light rays transmitted through the objective lens 18 cross in the optical path and are incident on the detection regions on the opposite side of the photodetector 24, an intensity distribution of the pattern on the photodetector 24 becomes different from the light intensity distribution obtained immediately after the rays are transmitted through the objective lens 18, and degradation is caused in characteristics of the track error detection signal. Therefore, when the beam spot size in the major axis direction (Y direction) of the light pattern formed on the photodetector 24 is small and a change in refractive index with respect to extraordinary light rays in a propagation direction of the extraordinary light rays transmitted through an optically anisotropic material causes the pattern intensity distribution on the photodetector 24 to become largely different from that obtained immediately after the extraordinary light rays are transmitted through the objective lens 18, focal point detection and track error detection are preferably performed by using only ordinary light rays.

Although the detecting optical element 14 shown in FIG. 1 uses the prisms 4 and 6 respectively made of an optically anisotropic material and an optically isotropic material, it is not preferable to form both the prisms 4 and 6 by using an optically anisotropic material. That is, when both the prisms 4 and 6 are made of an optically anisotropic material and arranged such that their optical axes are perpendicular to each other, a large split angle can be defined between extraordinary and ordinary light rays. If, however, ordinary and extraordinary light rays split in a prism made of an optically anisotropic material are transmitted through another optical element made of an optically anisotropic material, the ordinary light rays serve as extraordinary light rays in accordance with an arrangement of the optical element, and an aberration is given to light rays to be detected as described above to cause an erroneous defocus detection. The detecting optical element 14 used in the optical system of the present invention is obtained by bonding an optically anisotropic material to an optically isotropic material such as optical glass or transparent plastic consisting of acryl, polycarbonate, or an ABS resin, and light rays not adversely affected by a change in refractive index regardless of a propagation direction, such as ordinary rays are transmitted through the prisms 4 and 6.

When the spot size in the major axis direction (Y direction) of a light pattern formed on the photodetector 24 by extraordinary light rays is satisfactorily large and an intensity distribution of the pattern on the extraordinary light rays on the photodetector 24 is not much changed from that obtained immediately after the rays are transmitted through the objective lens 18, a defocus may be detected by using ordinary light rays, and a track error may be detected by using the extraordinary light rays. In this embodiment, as shown in FIG. 6, a region for detecting extraordinary light rays is divided into two detection regions 24e-1 and 24e-2, and the regions 24e-1 and 24e-2 are connected to a comparator 48 for generating a track error signal and to an adder 70 via preamplifiers, respectively. The detection regions 24a and 24d are directly connected to each other and then connected to a comparator 40 via a preamplifier, and the detection regions 24b and 24c are directly connected to each other and then connected to the comparator 40 via preamplifiers 31, 32, 33, 34. Since the circuit shown in FIG. 6 generates a defocus signal, a track error signal, an information reproduction signal, and a preformat signal in the same manner as the circuit shown in FIG. 5, a detailed description thereof will be omitted. According to the circuit arrangement shown in FIG. 6, the circuit can be simplified and the number of parts can be reduced as compared with the circuit shown in FIG. 5.

Figure 7:
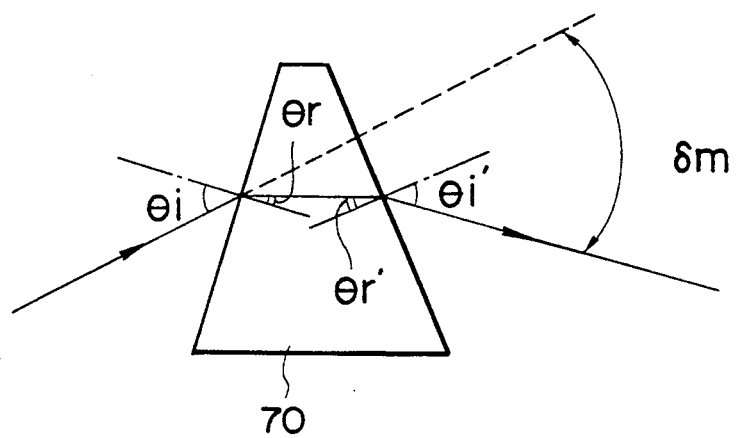
FIGS. 7 and 8 are schematic views for explaining the function of a prism of the detecting optical element shown in FIG. 2.

The detecting optical element 14 shown in FIG. 1 will be described below. In the detecting optical element 14, in order to reproduce information, a light beam from the information recording medium 12 is split into ordinary and extraordinary light rays by using a difference between refractive indexes of materials on the first and second boundary surfaces 14A and 14B. Therefore, as an angle defined between the first and second boundary surfaces 14A and 14B is increased, the light beam can be split into ordinary and extraordinary light rays more reliably. It is known that an angle of emerged light rays with respect to incident light rays, i.e., an angle of deflection δm of light rays obtained when the light rays are transmitted through a wedge prism 70 as shown in FIG. 7 is minimized when $\theta i = \theta i'$ and $\theta r = \theta r'$. The angle of deflection δm, therefore, can be increased by increasing an inclination angle of an emerging surface with respect to a plane perpendicular to an optical axis so as to be larger than an inclination angle of an incident surface as shown in FIG. 8. For this reason, a larger split angle between ordinary and extraordinary light rays can be obtained in an optical system shown in FIG. 9 than in the optical system shown in FIG. 1. That is, referring to FIG. 9, a prism 4 made of an optically anisotropic material is sandwiched between a first boundary surface 14A and a second boundary surface 14B, the second boundary surface 14B is arranged such that a second inclination angle with respect to a plane perpendicular to an optical axis, i.e., main light rays of a laser beam transmitted through the prism 4 is increased, and the first boundary surface 14A is inclined in the same direction of the second boundary surface such that the second inclination angle with respect to the plane perpendicular to the optical axis becomes larger than a first inclination angle. In this manner, a large split angle is preferably set between ordinary and extraordinary light rays. In addition, in this defocus detecting method of the present invention, spot sizes in the major axis direction (Y direction) and the minor axis direction (X direction) of a light pattern formed on the photodetector in an in-focus state are preferably properly set in order to obtain desired defocus detection characteristics. In order to obtain such proper spot sizes, angles of an incident surface (14A) and an emerging surface (14C) of the detection optical element (14) with respect to the optical axis must be properly set. As described above, the inclination angle of the second boundary surface 14B can be set large in order to increase the split angle between ordinary and extraordinary light rays on the basis of the first boundary surface 14A. As compared with this inclination angle, an inclination angle of the third boundary surface 14C is decreased.

An optically anisotropic material constituting either the prism member 4 or 6 is preferably arranged such that an optical axis of the prism member satisfies one of conditions to be described below. In the following conditions, the optical axis of an optically anisotropic material is defined as the major axis of an index ellipsoid of the optically anisotropic material.

(1) The optical axis of an optically anisotropic material is arranged at an angle close to a substantially right angle with respect to a propagation direction of ordinary light rays transmitted through the optically anisotropic material. More specifically, the arranging direction or plane of the optical axis corresponds to the X axis direction or the Y-Z plane in the optical system shown in FIG. 1 and is defined as a direction perpendicular to a propagation direction of ordinary light rays transmitted through the optically anisotropic material. With this arrangement, a refractive index ne of extraordinary light rays with respect to the material can be maximized, and a difference between the refractive index ne and a refractive index no of ordinary light rays with respect to the material can be maximized. Even if an angle of the first boundary surface 14A with respect to the second boundary surface 14B is comparatively small, therefore, a split angle between the ordinary and extraordinary light rays can be satisfactorily increased. The total thickness of the detecting optical element 14 can be decreased by setting a comparatively small angle between the first and second boundary surfaces 14A and 14B. As a result, since an amount of a coma produced in a light beam pattern formed on the photodetector 24 in the in-focus state can be satisfactorily decreased, degradation in defocus characteristics caused by the coma can be reduced. In addition, since an optical path length of light rays in the detecting optical system can be shortened, the entire optical system can be made compact.

(2) The optical axis of an optically anisotropic material is arranged parallel to the first, second, or third boundary surface 14A, 14B, or 14C. When one of the prism members 4 and 6 is manufactured by using an optically anisotropic material, the first, second, and third boundary surfaces 14A, 14B, and 14C are polished. In this case, the optically anisotropic material can be easily processed by setting the optical axis to be parallel to the first, second, or third boundary surface 14A, 14B, or 14C. As a result, manufacturability is improved to reduce manufacturing cost of the prism member as a unit part. In order to set the optical axis to be parallel to the second boundary surface 14B, the optical axis is set in the X axis direction or in a direction in the Y-Z plane and inclined by 45° with respect to the Y axis.

(3) The optical axis of an optically anisotropic material is inclined by 45° with respect to an S-polarized component or P-polarized component of a light beam incident on the light-transmittable reflecting layer 10. More specifically, the optical axis is set in a direction inclined by 45° with respect to the X or Y axis in the X-Y plane. A laser beam generated by the semiconductor laser 2 has a substantially elliptic sectional shape, and a focused spot formed on the information recording medium 12 also has an elliptic shape having the major and minor axes. In general, in order to increase the recording density on the information recording medium 12, the major axis direction of the focused spot must be sometimes set perpendicularly to the extension direction of the tracking guide of the recording medium 12. The direction of a polarization plane of a generated laser beam is generally parallel to the extension direction of an active layer, and therefore the polarization plane of a laser beam reflected by the information recording medium 12 is parallel to the S- or P-polarized component of a light beam incident on the light-transmittable reflecting layer 10. In order to split the light beam reflected by the recording medium 12 into ordinary and extraordinary light rays by the detecting optical element 14, the optical axis must be inclined by 45° with respect to the light-transmittable reflecting layer 10.

In consideration of the conditions (1) and (2), the optical axis of the material is preferably set parallel to the S polarization direction of a light beam incident on the first boundary surface 14A. More specifically, in the optical system shown in FIG. 1, the optical axis is preferably set parallel to the X axis or to satisfy the condition (3).

Figure 9:
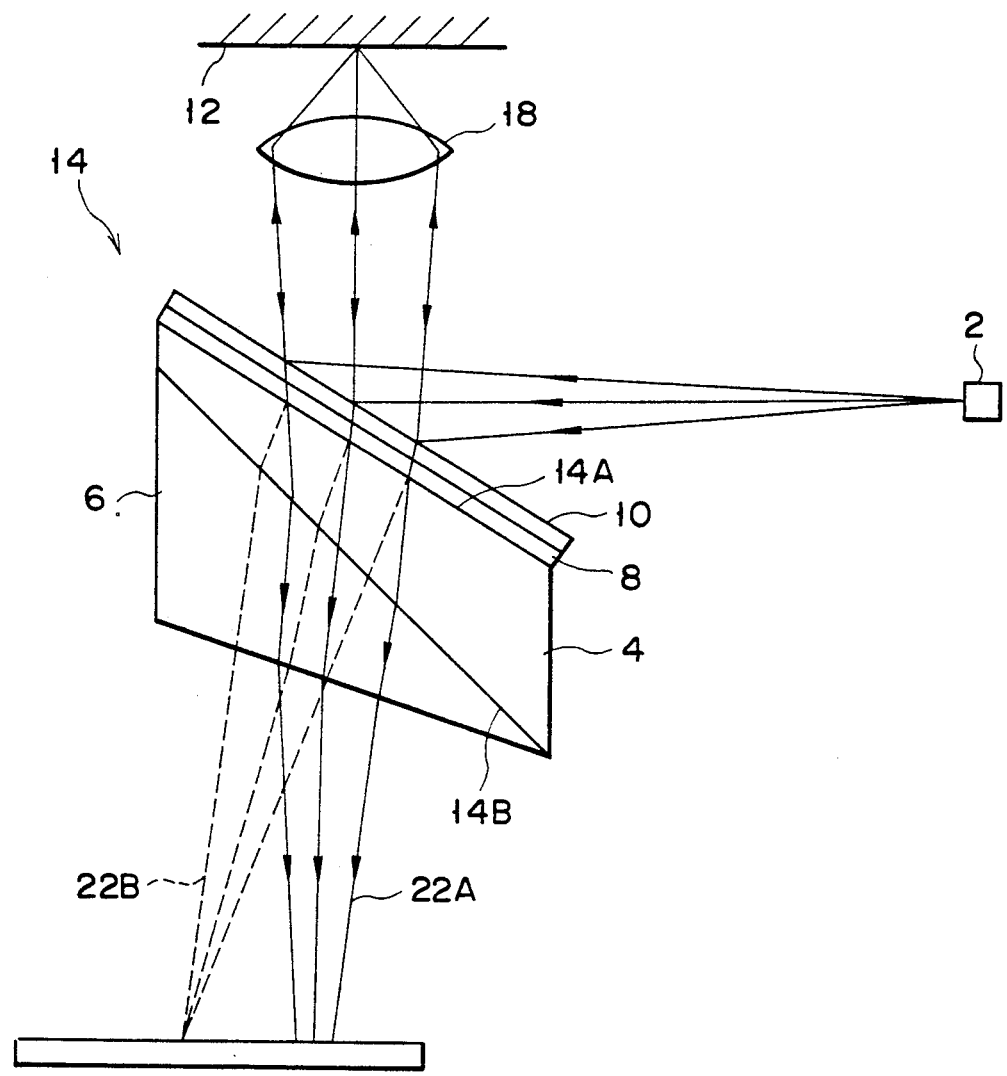
FIG. 9 is a schematic view showing an optical system of an information reproducing apparatus using a photomagnetic effect according to another embodiment of the present invention.

In the embodiments shown in FIGS. 1 and 9, the optical axis is set parallel to the X axis. In this case, the direction (X axis direction) of the S-polarized component of a light beam incident on the light-transmittable reflecting layer 10 coincides with the direction of electric displacement De of extraordinary light rays with respect to an optically anisotropic material, and the direction (Y axis direction) of a P component and electric displacement Do of ordinary light rays are set in the same Y-Z plane. In order to detect the same intensity of the ordinary and extraordinary light rays by the photodetector 24 in an in-focus state, a laser beam must be generated by the semiconductor laser 2 such that the polarization plane of the laser beam is inclined with respect to the X or Y axis. Assuming that an S component (amplitude component of an electric field) and a P component (amplitude component of an electric field) of a light beam generated by the semiconductor laser 2 and before the light-transmittable reflecting layer 10 are $I_S e^{i\omega t}$ and $I_P e^{i\omega t}$, respectively, reflection coefficients (amplitude reflectances) and transmission coefficients (amplitude transmittances) of S-polarized light and P-polarized light on the light-transmittable reflecting layer 10 are $R_S$, $R_P$, $T_S$, and $T_P$, respectively, a light amount reflectance of the information recording medium 12 is $r^2$, a light intensity reduction rate of a light beam obtained when the light beam is reciprocally transmitted through the objective lens 18 is $l^2$, and a phase shift amount between S- and P-polarized components produced when a light beam is reflected by and transmitted through the light-transmittable reflecting layer 10 is $\delta$, amplitudes $I_O$ and $I_E$ of ordinary and extraordinary light rays of a light beam reflected by the recording medium 12 toward the optically anisotropic material of the prisms 4 and 6 through the objective lens 18, the light-transmittable reflecting layer 10, and the mask layer 8 is represented by the following equation when a recording layer of the information recording medium 12 is not magnetized or a non-magnetic film is used as the recording layer:

$$I_E = T_S \cdot l \cdot r \cdot R_S \cdot I_S \cdot e^{i(\omega t + \delta)}$$

$$I_O = T_P \cdot l \cdot r \cdot R_P \cdot I_P \cdot e^{i\omega t}$$

Light intensities $|I_E|^2$ and $|I_O|^2$ of ordinary and extraordinary light rays, therefore, are represented by the following equation:

$$|I_E|^2 = T_S^2 \cdot l^2 \cdot r \cdot R_S^2 \cdot I_S^2$$

$$|I_O|^2 = T_P^2 \cdot l^2 \cdot r^2 \cdot R_P^2 \cdot I_P^2$$

In a differential detecting method of generating a difference between ordinary and extraordinary light rays as a reproduction signal by using a photomagnetic effect as described above, a C/N ratio can be maximized when the light intensities $I_E$ and $I_O$ satisfy a relation of $I_E = I_O$. In addition, it was experimentally confirmed that a comparatively good C/N ratio can be obtained by this differential detecting method when a ratio of $|I_E|^2/|I_O|^2$ falls within the range of $\frac{1}{2}$ to 2.0. It was also experimentally confirmed that signal detection can be performed by the differential detecting method even when the $|I_E|^2/|I_O|^2$ ratio falls within the range of $\frac{1}{4}$ to 4.0. Therefore, the following inequality is established assuming that $|I_E|^2/|I_O|^2 = T_S^2 R_S^2 / T_P^2 R_P^2 \cdot I_P^2$:

$$\frac{1}{4} \leq T_S^2 R_S^2 I_S^2 / T_P^2 R_P^2 I_P^2 < 4.0 \quad (1)$$

Preferably, the following g inequality is established:

$$\frac{1}{2} \leq T_S^2 R_S^2 I_S^2 / T_P^2 R_P^2 I_P^2 < 2.0 \quad (2)$$

In order to satisfy the above conditions, the optical characteristics of the light-transmittable reflecting layer 10 and the direction of a polarization plane of a laser beam generated by the semiconductor laser 2 must be properly set. That is, an angle $\theta$ defined by the polarization plane $I_R$ of a laser beam reflected by the information recording medium 12 in order to satisfy the relations (1) and (2) and transmitted through either the prism member 4 or 6 made of an optically anisotropic material and the direction of the electric displacement IO of ordinary light rays satisfies the following inequality as shown in FIG. 10:

$$\tan^{-1}\sqrt{\tfrac{1}{4}} < \theta < \tan^{-1}\sqrt{4} \text{ or,}$$

or $$\tan^{-1}\sqrt{\tfrac{1}{2}} < \theta < \tan^{-1}\sqrt{2}$$

In the differential detecting method, light intensity changes $\Delta|I_O|^2$ and $\Delta|I_E|^2$ on the information recording medium 12 with respect to ordinary and extraordinary light rays are preferably substantially equal to each other. In this case, in the relations (1) and (2), if $T_S \approx T_P$ and $R_S \approx R_P$ are established and $I_S \approx I_P$ is set, $\Delta|I_O|^2 = -\Delta|I_E|^2$ is established. When the light intensity changes $\Delta|I_O|^2$ and $\Delta|I_E|^2$ are to be set substantially equal to each other, if the values of $T_S$ and $T_P$ are largely different from each other or the values of $R_S$ and $R_P$ are largely different from each other, the values of $I_S$ and $I_P$ must be set largely different from each other in accordance with the values of $T_S$ and $T_P$ or $R_S$ or $R_P$. When an optical system is to be designed such that the values of $I_S$ and $I_P$ are largely different from each other, if the semiconductor laser 2 is slightly misadjusted, the polarization plane of a laser beam is rotated, and the values of $I_S$ and $I_P$ fall outside the range of set values. As a result, the above conditions may not be satisfied. To the contrary, when the light-transmittable reflecting layer 10 satisfies $T_S \approx T_P$ and $R_S \approx R_P$ and $I_S \approx I_P$ is set, even if the semiconductor laser 2 is slightly misadjusted to rotate the polarization plane of a laser beam, degradation in reproduction signal can be minimized.

As described above, a non-polarizing beam split layer is used as the light-transmittable reflecting layer 10, and the polarization plane of a light beam from the semiconductor laser 2 is set such that ordinary and extraordinary light rays become equal to each other when they are detected. Therefore, a reproducing circuit can be stabilized, and a degree of allowance in assembly/adjustment of an optical system can be set large.

Although a non-polarizing beam split layer is used as the light-transmittable reflecting layer 10 in the optical system shown in FIG. 1 or 9, the polarization plane of a laser beam generated by the semiconductor laser 2 or of a laser beam generated by the semiconductor laser 2 and immediately after transmitted through a polarizer (not shown) is rotated around the optical axis of the optical system by 45° with respect to the inclination direction of the incident surface of the light-transmittable reflecting layer 10 shown in FIG. 1 or 9 and is inclined by 45° in an optically anisotropic material with respect to the direction of the electric displacement Do of ordinary light rays or the electric displacement De of extraordinary light rays. That is, although the light-transmittable reflecting layer 10 can be designed to satisfy the above conditions of $T_S \approx T_P$ and $R_S \approx R_P$, it is difficult to design the layer to strictly satisfy $T_S = T_P$ and $R_S = R_P$.

In the optical systems shown in FIGS. 1 and 9, one of the first and second prisms 4 and 6 is made of an optically anisotropic material, and the other one is made of a optically isotropic material for the following reason. That is, when a parallel light beam transmitted through a wedge prism made of an optically anisotropic material is focused by a focusing lens and incident on a photodetector, ordinary and extraordinary light rays can be reliably split from each other by only the wedge prism made of an optically anisotropic material. If, however, a convergent light beam or a divergent light beam is transmitted through only a wedge prism made of an optically anisotropic material and incident on a photodetector, beam spots formed on the photodetector by ordinary and extraordinary light rays may be too elongated and overlap each other. For this reason, a prism made of an optically isotropic material is arranged so that the beam spots do not overlap each other. When two wedge prisms respectively made of an optically anisotropic material and an optically isotropic material are bonded to each other, the resultant structure looks like a thick glass plate having substantially parallel surfaces. When a convergent light beam is transmitted through the prisms, therefore, a spot size is not much increased by the photodetector. To the contrary, since a taper angle of a wedge prism made of an optically anisotropic material is large, a split angle between ordinary and extraordinary light rays is increased. A short beam spot having a proper size is formed by the prism made of an optically isotropic material and reliably split on the photodetector, and a defocus can be reliably detected by detecting one of the beam spots. In general, when a light beam is incident on a parallel plate arranged to be inclined on an optical path, an incident light beam and an emerged light beam maintain a parallel relationship. Therefore, when the first boundary surface 14A and the third boundary surface 14C of the detecting element 14 shown in FIG. 1 or 9 are arranged parallel to each other, a comparatively small beam spot is formed on the photodetector 24 in an in-focus state. However, in order to increase an angle between ordinary and extraordinary light rays in the propagation direction to obtain a wide interval between beam spots formed on the photodetector 24, if an angle defined between the first and second boundary surfaces 14A and 14B is increased while the second and third boundary surfaces 14B and 14C are kept substantially parallel to each other, beam spots formed by the two types of light rays may be elongated and overlap each other. For this reason, an angle defined by the second boundary surface 14B with respect to the first boundary surface 14A is set larger than that defined by the light-emerging surface 14C with respect to the first boundary surface 14A so that the first boundary surface 14A as a light incident surface and the light-emerging surface 14C are arranged substantially parallel to each other, and an angle which allows the first and second boundary surfaces 14A and 14B to constitute a split optical system is set between the two surfaces, thereby reliably splitting a light beam into ordinary and extraordinary light rays and decreasing the size of a beam spot formed by each of the two types of light rays.

In the optical system shown in FIGS. 1 and 2, the first prism 4 is made of an optically anisotropic material, and the second prism 6 is made of an optically isotropic material. It is obvious, however, that the first prism 4 may be made of an optically isotropic material and the second prism 6 may be made of an optically anisotropic material. In addition, in the optical system shown in FIGS. 1 and 2, a combination of a pair of prisms is used. The detecting optical element 14, however, is not limited to a pair of prisms but may be a multilayered structure in which a plurality of prisms made of an optically anisotropic material and an optically isotropic material are combined. The surfaces of the prisms 4 and 6 may be bonded and fixed to each other by using an adhesive, e.g., an ultraviolet-curing adhesive, or portions around the surfaces may be fixed by an adhesive or mechanical members such as screws while the surfaces are in only contact with each other.

Figure 11:
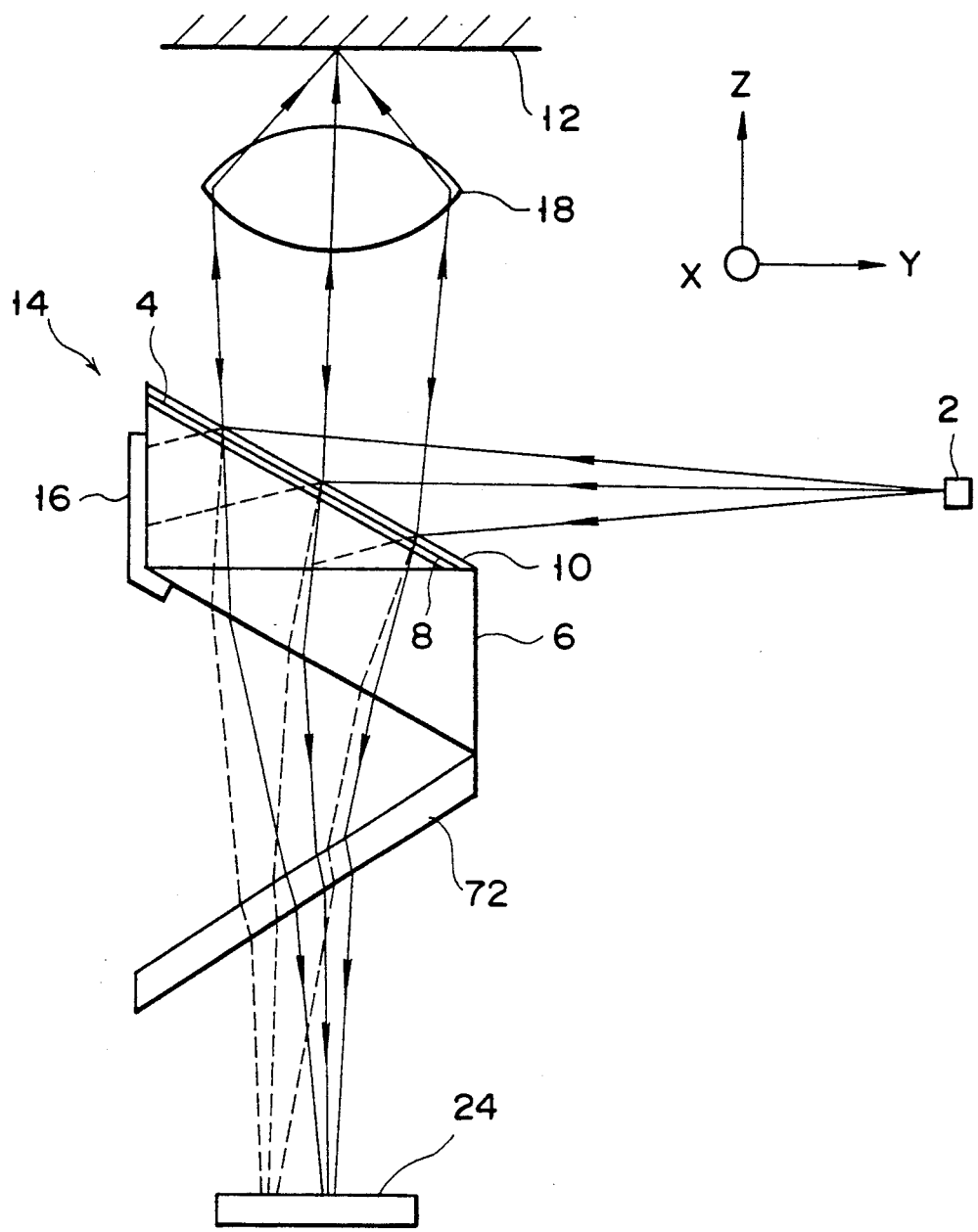

In the detecting optical element 14 shown in FIGS. 1 and 9, the photodetector 16 has a PIN structure in which a silicon chip is arranged in a package, and is fixed on the side surface of the prism member 4. As shown in FIG. 11, however, the photodetector 16 may be arranged from the side surface of the prism member 4 to the surface of the prism member 6. Referring to FIG. 11, reference numeral 72 denotes a coma correcting plate for correcting a coma which may be given to ordinary light rays by the detecting optical element 14. When the photodetector 16 is arranged in this manner, the photodetector 16 is preferably formed to have a film structure. That is, a transparent conductive layer such as a NESA film is formed as an undercoating layer on a surface for forming a photodetector, and a p-n junction structure is formed by amorphous silicon on the transparent conductive layer, thereby forming a photodetector. Alternatively, the photodetector may have a multilayered structure in which a photoconductor film such as an organic photoconductive film consisting of, e.g., Te, Cds, or copper phthalocyanine is sandwiched between a transparent conductive film such as a NESA film and a conductive film consisting of, e.g., Al or Cu. The photodetector 16 generally has reflecting characteristics regardless of its structure. Therefore, a part of an incident light beam may be reflected by the photodetector 16 and incident on the semiconductor laser 2 or the photodetector 24, thereby destabilizing an operation of the semiconductor laser 2 or mixing noise components in a signal generated by the photodetector 24. In order to prevent the light beam reflected by the photodetector 16 from being incident on the photodetector 24 or the semiconductor laser 2, the surfaces of the prisms 4 and 6 are preferably formed to be random reflection surfaces, i.e., rough surfaces. Alternatively, the optical system is preferably arranged such that an optical path of a light beam reflected by the photodetector 16 is different from an optical path of a laser beam generated by the semiconductor laser 2 toward the photodetector 16 and from an optical path extending from the information recording medium 12 to the photodetector 24, i.e., an optical path of ordinary and extraordinary light rays in the detecting optical element 14. For example, when the surface of the photodetector 16 is arranged substantially parallel to an optical axis passing through the objective lens 18 and the detecting optical element 14, a light beam is reflected by the photodetector 16 in a direction different from the direction of a laser beam generated by the semiconductor laser 2 toward the photodetector 16 and the direction of ordinary and extraordinary light rays in the detecting optical element 14.

In order to prevent light rays reflected by a light-shielding region from forming an unnecessary focused spot on the information recording medium as stray light, the mask layer 8 of the detecting optical element 14 preferably has a light-shielding region made of a light-absorbing member. Even if the light-shielding region has slight reflecting characteristics and slightly reflects light incident on the region, the light intensity of the light reflected by the region must be suppressed to be 1/10 or less the light intensity of the incident light. This light-shielding region, therefore, must be made of a light-shielding member having a light reflectance of 10% or less. It was experimentally confirmed that when the light-shielding region is made of a light-absorbing member having a property of slightly transmitting light, the light transmittance of the light-absorbing member is preferably 20% or less. This is because although defocus detection sensitivity is degraded since light rays transmitted through the light-absorbing member are detected, detection sensitivity degradation of up to about 80% is allowed. This mask layer 8 is formed by, an a lift-off method, for example. That is, a photoresist layer is formed on the first boundary surface 14A, and a mask pattern is arranged on the photoresist layer and exposed and developed to form a negative pattern. After a light-absorbing layer is formed on this negative pattern, the photoresist layer is removed by a solvent to form a desired mask layer 8. In the mask layer 8 having the above structure, a region other than the light-shielding region is defined as a light-transmitting layer. In this region, the first boundary surface 14A is directly exposed, and a light-transmittable reflecting layer, i.e., the non-polarizing split layer 10 is formed on the exposed light-transmitting layer.

In the optical system shown in FIGS. 1 and 9, quartz crystal or rutile is used as an optically anisotropic material. A material such as quartz crystal or rutile has a color dispersion and a positive Abbe's number and increases its refractive index with respect to light rays transmitted therethrough when the wavelength of the light rays is short. Therefore, the propagation direction of light rays of a laser beam transmitted through the optically anisotropic material is changed after refraction even if the wavelength of the light rays is only slightly changed ragardless of whether the light rays are ordinary or extraordinary light rays. As a result, the center of a light pattern formed on the photodetector 24 may be moved due to a wavelength variation caused in accordance with an output change in laser beam generated by the semiconductor laser 2 to adversely affect defocus and track error detection. According to the present invention, however, in the detecting optical element 14 having a structure in which an optically anisotropic material and an optically isotropic material are bonded to each other, a large split angle is set between ordinary and extraordinary light rays as described above, and a spot size in the longitudinal direction is decreased on the photodetector 24 to prevent overlap of two spots and perform color correction. That is, when the wavelength of a laser beam is changed, the deflection direction of the propagation direction of a laser beam transmitted through an optically anisotropic material becomes opposite to that of a laser beam to cancel a change in propagation direction of the laser beam after the beam is transmitted through the detecting optical element 14 with respect to the wavelength variation in laser beam. Similar to rutile or quartz crystal, general optical glass also has a positive Abbe's number (i.e., increases its refractive index when a wavelength is shortened). Therefore, the above canceling effect can be obtained by setting the wedge directions of an optically anisotropic material and optical glass as an optically isotropic material to be opposite to each other. That is, in FIGS. 1 and 9, the above effect can be achieved by setting the direction of a wedge angle defined between the first and second boundary surfaces 14A and 14B on the two sides of an optically anisotropic material to be opposite to that of a wedge angle defined between the second and third boundary surfaces 14B and 14C on the two sides of an optically isotropic material. When quartz crystal is selected as the optically anisotropic material, since the color dispersion of quartz crystal is comparatively small, optical glass having a large Abbe's number, e.g., BK7-based, BK-based, PK-Based, FK-based, PSK-based, SK-based, BaK-based, K-based, LaK-based, SSK-based, BaLF-based, KF-based, LaK-based, or LaSK-based optical glass is suitably used as the optically isotropic material. Rutile has a large refractive index and a small Abbe's number since its refractive index variation caused by a wavelength change is large. In addition, LaSF-based optical glass having a large refractive index is suitably used as the optically isotropic material. Other examples are SF-based, LcF-based, BaSF-based, BaF-based, F-based, LF-based, and LLF-based optical glass and a transparent plastic material.

Figure 12:
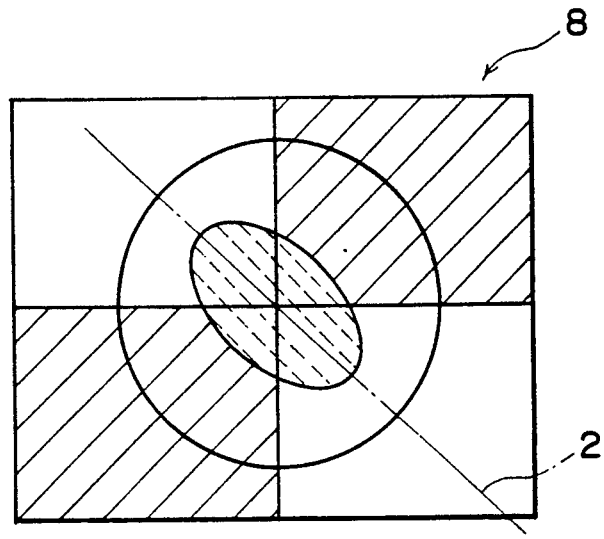

In the above embodiment, a non-polarizing beam splitter layer is used as the light-transmittable reflecting layer 10, and the optical system is arranged such that the optical axis of an optically anisotropic material is set in the S polarization direction (X direction shown in FIG. 1) with respect to the first boundary surface 14A and the polarization plane of a laser beam generated by the semiconductor laser 2 is inclined by 45° with respect to the X and Z axes. A laser beam generated by a semiconductor laser generally has an elliptic beam section, and its polarization plane is normally set parallel to the minor axis of the ellipse. In the optical system shown in FIG. 1, since the two perpendicular boundary lines of the mask layer 8 are set parallel to the X and Y axes, respectively, the section of a light beam reflected by the information recording medium 12 and transmitted through the objective lens has an elliptic intensity distribution, and its major axis is inclined by 45° with respect to the two boundary lines of the mask layer. In the embodiment of the present invention, as shown in FIG. 12, a major axis L of this elliptic intensity distribution is arranged to cross the light-transmitting region of the mask layer 8. For this reason, as compared with an arrangement in which the major axis direction L is set to cross the light-absorbing region, the light intensity of a light beam transmitted through the mask layer 8 can be increased to improve a C/N ratio of a reproduction signal.

In the above embodiment, a non-polarizing beam splitter layer is used as the light-transmitting reflecting layer. As another embodiment of an optical system of the present invention, however, the light-transmitting reflecting layer may have polarizing characteristics to improve a C/N ratio of a photomagnetic type detection signal. In this embodiment, as the polarizing characteristics of the light-transmittable reflecting layer, the reflectance and transmittance of S-polarized light are set to be 20% or less (preferably, 0%) and 80% or more (preferably, 100%), respectively, and the reflectance and transmittance of P-polarized light are set to be 50% to 90% and 50% to 10%, respectively, thereby setting the polarizing direction of a laser beam immediately after generation by the semiconductor laser element in the Z axis direction. Alternatively, the reflectance and transmittance of the P-polarized light are set to be 20% or less (preferably, substantially 0%) and 80% or more (preferably, 100%), and the reflectance and transmittance of the S-polarized light are set to be 50% to 90% and 50% to 10%, respectively, thereby setting the polarizing direction of a laser beam immediately after generation by the semiconductor laser 2 in the X axis direction. In either case, the direction of an optical axis of an optically anisotropic material projected on the X-Y plane from the Z axis direction is inclined by 45° with respect to the X and Y axes. That is, the optical axis of an optically anisotropic material is determined such that the conditions (2) and (3) described above are satisfied and the direction of the optical axis is set parallel to the first boundary surface and inclined by 45° with respect to the X and Y axes when projected on the X-Y plane from the Z axis direction.

Figure 13:
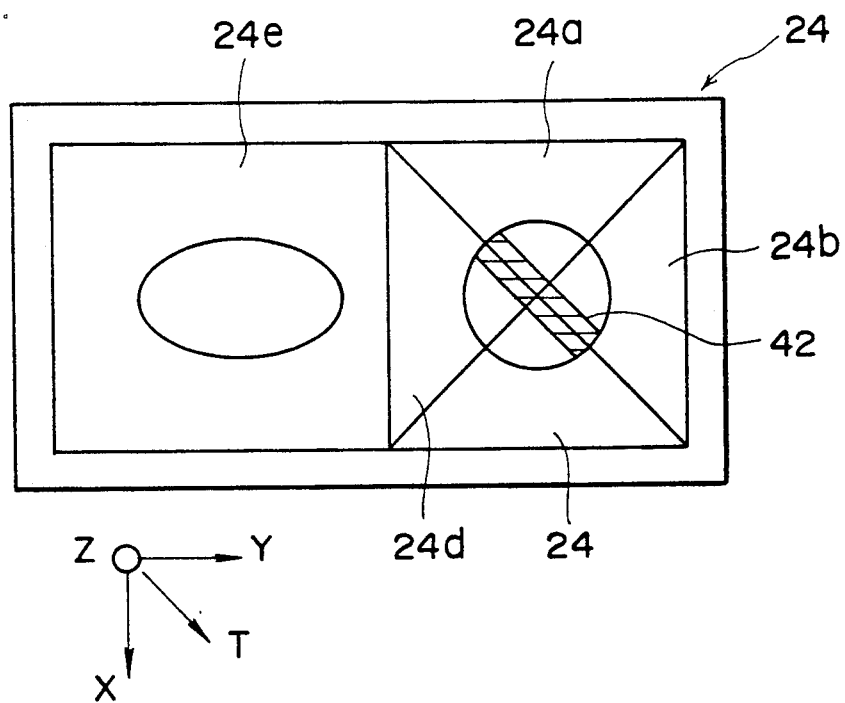

The present invention is not limited to the defocus detection systems shown in FIGS. 1 and 9 but can be applied to any conventionally known defocus detecting optical system. FIG. 11 shows still another embodiment of the present invention using an astigmatism method as a defocus detecting optical system. In this embodiment, two optically anisotropic materials 4 and 6 are bonded to each other to produce an astigmatism in a light beam transmitted through the materials 4 and 6, and a laser beam is divided into ordinary and extraordinary light rays for signal detection. When such an astigmatism method is used, not a combination of an optically anisotropic material and an optically isotropic material but a combination of two optically anisotropic materials is used such that their optical axes are set to be perpendicular to each other. In this optical system, although a coma is produced simultaneously with the astigmatism, this coma is removed when a light beam is transmitted through an inclined parallel plate 72 for coma correction. A pattern as shown in FIG. 13 is formed on a photodetector 24 in an in-focus state. This photodetector 24 has detection regions 24a, 24b, 24c, and 24d divided by orthogonal division lines, and an image 42 of a tracking guide formed on an information recording medium is formed on the photodetetor 24 in the direction indicated by T along one division line. As is well known, assuming that outputs from the detection regions 24a, 24b, 24c, 24d, and 24e of the photodetector 24 are A, B, C, D, and E, respectively, a focus detection signal is given by $(A+C)-(B+D)$, a track error detection signal is given by $(A+B)-(C+D)$, and a reproduction signal using a photomagnetic effect is given by $(A+B+C+D)-E$.

FIG. 14 shows still another embodiment using a knife-edge method as a defocus detecting method. In this embodiment, unlike in the embodiment shown in FIG. 1, a first boundary surface 14A and a third boundary surface 14C are formed substantially parallel to each other. Therefore, a light pattern having a small width is formed on a photodetector 24 in an in-focus state to improve defocus detecting sensitivity of the knife-edge method. A mask layer 8 is formed in a second boundary surface defined between a prism member 4 made of an optically isotropic material and a prism member 6 made of an optically anisotropic material. Therefore, the manufacturability of a detecting optical element 14 can be improved. As shown in FIG. 15, the mask layer 8 is constituted by light-transmitting regions 8A and 8B, and a light pattern having a shape shown in FIG. 16 is formed on detection regions 24a, 24b, 24c, and 24d of a photodetector 24 in an in-focus state. Assuming that output signals from the detection regions of the photodetector 24 are A, B, C, D, and E, a focus detection signal is obtained by $(A+B)-(C+D)$, a track error detection signal is obtained by $(A+C)-(B+D)$, and signal detection using a photomagnetic effect is obtained by $(A+B+C+D)-E$.

Figure 17:
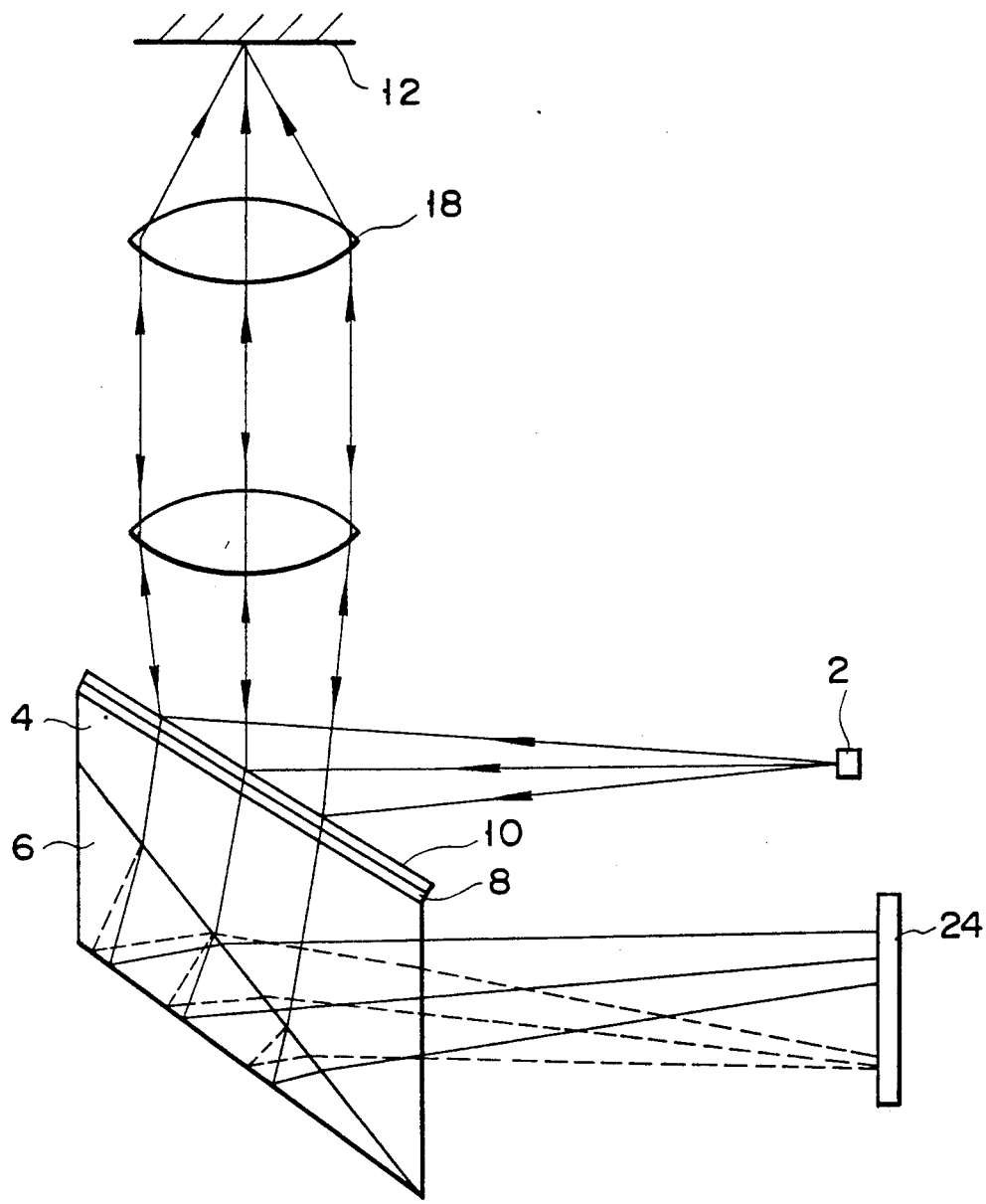
Figure 22:
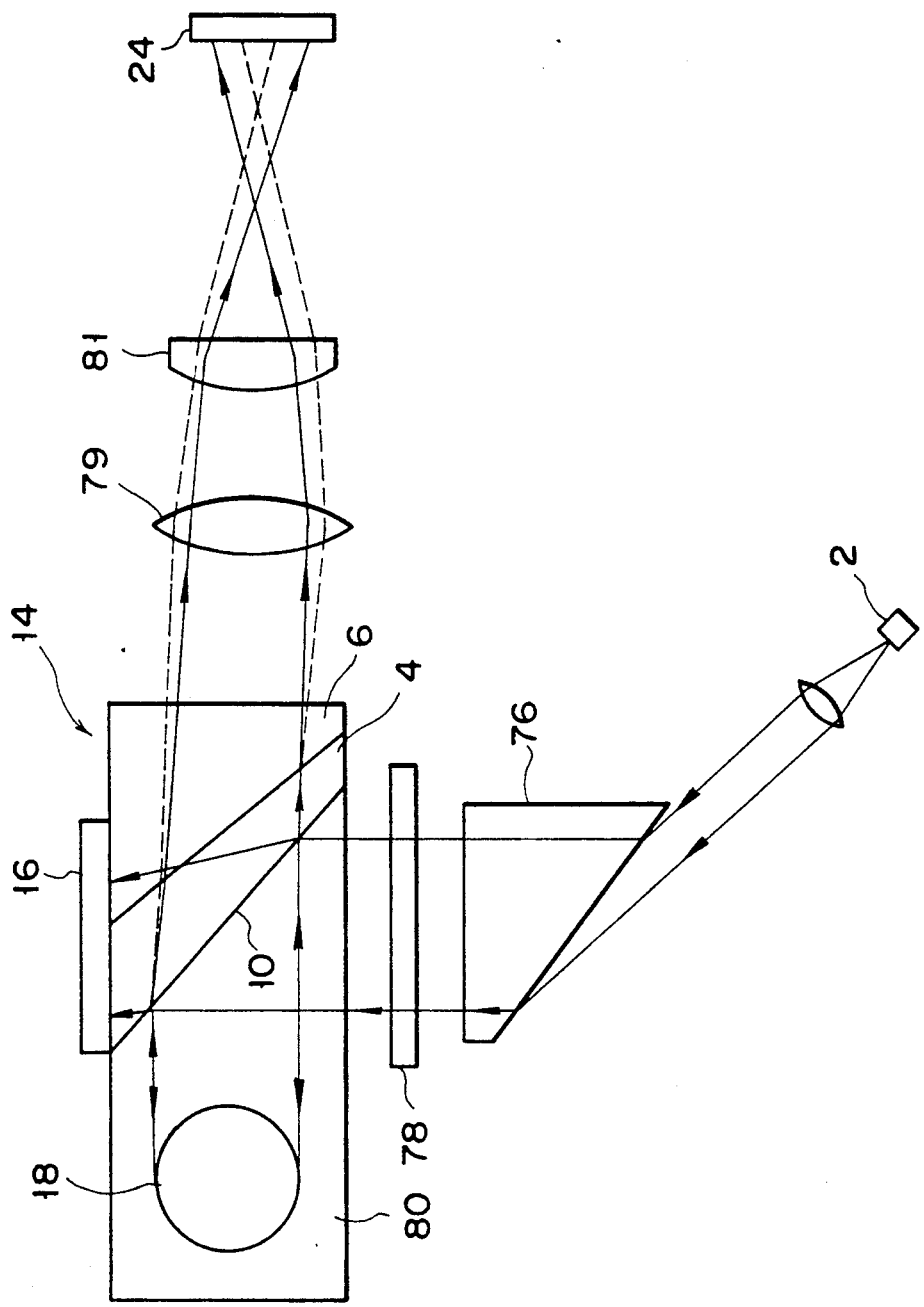

In each of the above optical systems, in order to divide a laser beam for signal detection using a photomagnetic effect, a light beam is transmitted through the detecting optical element 14. As shown in FIGS. 17, 18, and 19, however, a reflecting optical element may be used. That is, a laser beam is totally reflected by one end face of a prism member 6 made of an optically anisotropic material. Since the prism member 6 is formed to have a wedge shape, the laser beam is split int ordinary and extraordinary light rays at the other end face of the prism member 6 arranged to oppose the reflecting surface and in contact with a prism 4 made of an optically isotropic material by using refraction upon incidence and emergence of the laser beam.

As shown in FIGS. 20 to 24, when an optical path-converting prism 80 made of an optically isotropic material, e.g., optical glass consisting of BK7 is arranged in an optical path, the height of the entire optical system can be decreased since the optical path is bent. As shown in FIGS. 20 and 21, when the optical path-converting prism 80 is bonded integrally with a detecting optical element 14, the size of an optical system can be further decreased. In the embodiment shown in FIG. 20, a mask layer 8 is not formed in a bonding portion between the optical path converting prism 80 and the detecting optical element 14 but formed in a bonding portion between prisms 4 and 6. In embodiments shown in FIGS. 22 and 23, a non-polarizing beam splitter layer 10 is formed between two optically isotropic materials, one of which serves as an optical path-converting prism. In these embodiments, a defocus is detected by an astigmatism method using a focusing lens 79 and a cylindrical lens 81 without using a mask layer 8.

As has been described above, according to the present invention, an information reproducing apparatus using a photomagnetic effect is provided, which can be made compact since an optical system is made compact and simplified.

More specifically, according to the present invention, (1) the number of optical parts can be decreased to improve productivity and reduce manufacturing cost. (2) The entire optical system can be made compact and light in weight to realize high-speed access. (3) An optically anisotropic material and an optically isotropic material are bonded such that an inclination of one bounary surface of the optically anisotropic material is set large while an inclination of a boundary surface between the optically anisotropic material and the optically isotropic material is set small, thereby constituting a detecting optical element. As a result, a split angle between ordinary and extraordinary light rays can be increased, a spot size formed on a photodetector can be decreased, and a chromatic aberration produced by the optically anisotropic material can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical system for reading out information from an information recording medium comprising:

means for generating a light beam;

means for separating said light beam from the information recording medium into first and second light beams having different first and second polarization planes, said separating means including a first prism of an anisotropic material having first and second refractive indices differing for the first and second light beams, respectively, and a second prism of an isotropic material having a third refractive index applicable to both of the first and second light beams, wherein said first prism includes a surface defining first, second, and third edge angles, said first edge angle of said first prism being smaller than said second and third edge angles of said first prism, said second prism includes a surface defining first, second, and third edge angles, said first edge angle of said second prism being smaller than said second and third edge angles of said second prism and smaller than said first edge angle of said first prism, and said first and second prisms are bonded such that said first edge angle of said first prism is adjacent to said second edge angle of said second prism, and said first edge angle of said second prism is adjacent said second edge angle of said first prism; and means for reproducing information recorded on the information recording medium in accordance with the first and second separated light beams from said separating means.

2. A system according to claim 1, wherein said first prism has an optical axis and a light-incident surface and a light-emerging surface through which said optical axis extends, an inclination angle of said first prism consists of rutile, and said second prism consists of optical glass having a small Abbe's number or transparent plastic.

3. A system according to claim 2, wherein the second edge angle of the first prism is substantially a right angle.

4. A system according to claim 1, further comprising:

means, movable along an optical axis, for converging the light beam on the information recording medium;

means for generating a focusing signal corresponding to a position of said converging means on the optical axis, in response to the first light beam from said splitting means; and means for moving said converging means in accordance with the focusing signal to maintain said converging means in a in-focus state in which a minimum beam spot is formed on the information recording medium by the light beam.

5. A system according to claim 4, wherein said information recording medium has a track.

6. A system according to claim 4, wherein the second edge angle of the first prism is substantially a right angle.

7. A system according to claims 5, wherein said focusing signal generating means includes means for generating a tracking signal in response to the first light beam, and means for causing said converging means to oppose said track of said information recording medium in response to the tracking signal, thereby tracking said track by said light beam.

8. A system according to claims 5, wherein said focusing signal generating means includes means for generating a tracking signal in response to the second light beam, and means for causing said converging means to oppose said track of said information recording medium in response to the tracking signal, thereby tracking said tack by said light beam.

9. A system according to claim 5, wherein the second edge angle of the first prism is substantially a right angle.

10. A system according to claim 7, wherein the second edge angle of the first prism is substantially a right angle.

11. A system according to claim 8, wherein the second edge angle of the first prism is substantially a right angle.

12. A system according to claim 1, wherein the second edge angle of the first prism is substantially a right angle.

13. An optical system for reading out information from an information recording medium, comprising:

means for generating a light beam;

splitting means for splitting the light beam into reflected and transmitted light beams, which includes a beam splitting film having first and second surfaces and specific optical reflectance and optical transmittance, the reflected light beam being reflected from the beam splitting film to the information recording medium and the transmitted light beam being transmitted through the beam splitting film, converging means, movable along an optical axis, for converging the reflected light beam on an information recording medium;

separating means for separating a light beam from the information recording medium into first and second light beams having different first and second polarization planes, said separating means including a first prism of an anisotropic material having first and second refractive indices differing for the first and second light beams, respectively, and a second prism made of an isotropic material having a third refractive index applicable to both of the first and second light beams;

means for generating a focusing signal corresponding to a position of said converging means on the optical axis, in response to the first light beam from said separating means; and moving means for moving said converging means in accordance with the focusing signal to maintain said converging means in a in-focus state in which a minimum beam spot is formed on the information recording medium by the reflected light beam, wherein the light beam includes S- and P-wave components, and wherein said beam splitting film has characteristics defined by the following inequality:

$$\tfrac{1}{4} \leq T_S^2 R_S^2 I_S^2 / T_P^2 R_P^2 I_P^2 < 4.0$$

where TS and TP are respectively the transmittances with respect to polarized beams of S and P waves, $R_S$ and $R_P$ are respectively the reflectances with respect to polarized beams and S and P waves, and $I_S$ and $I_P$ are respectively the amplitudes of S and P waves of a light beam incident from said generating means onto said beam splitting film.

14. A system according to claim 13, wherein said beam splitting film has non-polarizing characteristics.

15. A system according to claim 13, wherein said first prism gives different optical path lengths to the first and second light beams.

16. A system according to claim 13, wherein said beam splitting film has an optical axis which defines an angle of 45° with respect to a polarization plane of the first light beam.

17. An optical element used for a system for reading out information from an information recording medium, comprising:

means for generating a light beam;

separating means for separating said light beam into first and second light beams having different first and second polarization planes, said separating means including a first prism of an anisotropic material having first and second refractive indices differing for the first and second light beams, respectively, said first prism including a surface defining first and second edge angles, said first edge angle of said first prism being smaller than said second edge angle of said first prism, and a second prism of an isotropic material having a third refractive index applicable to both of the first and second light beams, said second prism including a surface defining first and second edge angles, said first edge angle of said second prism being smaller than said second edge angle of said second prism wherein said first prism and said second prism are mutually bonded to define an interface such that said first edge angle of said first prism is separated from said first edge angle of said second prism by a first distance along the interface, and said first edge angle of said first prism is separated from said second edge angle of said second prism by a distance smaller than the first distance along the interface; and means for reproducing information recorded on the information recording medium in accordance with the first and second light beams from said separating means.

18. A system according to claim 17, wherein said first prism consists of quartz crystal, and said second prism consists of optical glass having a large Abbe's number.

19. A system according to claim 18, wherein the second edge angle of the first prism is substantially a right angle.

20. A system according to claim 17, wherein said first prism consists of rutile, and said second prism consists of optical glass having a small Abbe's number of transparent plastic.

21. A system according to claim 20, wherein the second edge angle of the first prism is substantially a right angle.

22. A system according to claim 17, wherein said first prism has an optical axis and a light-incident surface and a light-emerging surface through which said optical axis extends, an inclination angle of said light-emerging surface with respect to said optical axis being larger than that of said light-incident surface.

23. A system according to claim 22, wherein the second edge angle of the first prism is substantially a right angle.

24. A system according to claim 17, wherein the second edge angle of the first prism is substantially a right angle.

* * * * *

UNITED STATES PATENT AND TRADEMARK OFFICE
CERTIFICATE OF CORRECTION

PATENT NO. : 5,272,685
DATED : December 21, 1993
INVENTOR(S) : Hideo Ando

It is certified that error appears in the above-indentified patent and that said Letters Patent is hereby corrected as shown below:

Claim 2, column 21, line 55, delete "first prism consists".

Claim 2, column 21, lines 56-57 delete entirely and insert --light-emerging surface with respect to said optical axis being larger than that of said light-incident surface--.

Claim 7, column 22, line 11, change "claims" to --claim--.

Claim 8, column 22, line 18, change "claims" to --claim--.

UNITED STATES PATENT AND TRADEMARK OFFICE
CERTIFICATE OF CORRECTION

PATENT NO. : 5,272,685
DATED : December 21, 1993
INVENTOR(S) : Hideo Ando

It is certified that error appears in the above-indentified patent and that said Letters Patent is hereby corrected as shown below:

Claim 19, column 24, line 22, change "aright" to --a right--.

Signed and Sealed this

Third Day of January, 1995

Attest:

BRUCE LEHMAN

*Attesting Officer*      *Commissioner of Patents and Trademarks*